US011976859B2

(12) United States Patent
Ueda et al.

(10) Patent No.: US 11,976,859 B2
(45) Date of Patent: May 7, 2024

(54) REFRIGERATION CYCLE APPARATUS

(71) Applicant: DAIKIN INDUSTRIES, LTD., Osaka (JP)

(72) Inventors: Hiroki Ueda, Osaka (JP); Atsushi Yoshimi, Osaka (JP); Eiji Kumakura, Osaka (JP); Masaki Tanaka, Osaka (JP); Masaki Nakayama, Osaka (JP); Ryuhei Kaji, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/374,904

(22) Filed: Sep. 29, 2023

(65) Prior Publication Data
US 2024/0019181 A1 Jan. 18, 2024

Related U.S. Application Data

(63) Continuation of application No. PCT/JP2022/014557, filed on Mar. 25, 2022.

(30) Foreign Application Priority Data

Mar. 31, 2021 (JP) ................................ 2021-062242

(51) Int. Cl.
*F25B 43/00* (2006.01)
*F25B 9/00* (2006.01)

(52) U.S. Cl.
CPC .............. *F25B 43/00* (2013.01); *F25B 9/006* (2013.01); *F25B 9/008* (2013.01);
(Continued)

(58) Field of Classification Search
CPC ...... F25B 43/00; F25B 9/006; F25B 2400/08; F25B 2400/23; F25B 2600/2501
See application file for complete search history.

(56) References Cited

U.S. PATENT DOCUMENTS 6,449,962 B1 9/2002 Takemasa et al.
2017/0113514 A1* 4/2017 Tsubouchi ......... B60H 1/00885

FOREIGN PATENT DOCUMENTS

CN 109556311 A * 4/2019 ............ F25B 17/083
CN 109631405 A * 4/2019
(Continued)

OTHER PUBLICATIONS

Decision to Grant Patent issued in Japanese Application No. 2021-062242, dated Aug. 31, 2022.
(Continued)

*Primary Examiner* — Kun Kai Ma
(74) *Attorney, Agent, or Firm* — Birch, Stewart, Kolasch & Birch, LLP

(57) ABSTRACT

A refrigeration cycle apparatus includes a refrigeration cycle, an adsorption section, and a first bypass flow path. The refrigeration cycle includes a compressor, a radiator, an expansion mechanism, and an evaporator, and uses a non-azeotropic refrigerant mixture including a first refrigerant and a second refrigerant. The adsorption section includes an adsorbent and stores the first refrigerant adsorbed by the adsorbent. The adsorbent adsorbs the first refrigerant, and does not adsorb the second refrigerant or the adsorption performance thereof for the second refrigerant is lower than the adsorption performance thereof for the first refrigerant. The first bypass flow path connects a first end which is a high-pressure part of the refrigeration cycle and a second end which is a low-pressure part of the refrigeration cycle. The adsorption section and a valve are disposed in the first bypass flow path.

20 Claims, 11 Drawing Sheets

(52) U.S. Cl.
CPC ....... *F25B 2400/08* (2013.01); *F25B 2400/23* (2013.01); *F25B 2600/2501* (2013.01)

(56) References Cited

FOREIGN PATENT DOCUMENTS

| | | | |
|---|---|---|---|
| CN | 109737624 A | * | 5/2019 |
| JP | 62-80452 A | | 4/1987 |
| JP | 62-288455 A | | 12/1987 |
| JP | 7-98181 A | | 4/1995 |
| JP | 9-119721 A | | 5/1997 |
| JP | 11-23078 A | | 1/1999 |
| JP | 2000-74511 A | | 3/2000 |
| JP | 2002-333227 A | | 11/2002 |
| JP | 2007-85586 A | | 4/2007 |
| WO | WO2019/073596 A1 | | 4/2019 |

OTHER PUBLICATIONS

International Search Report (PCT/ISA/210) issued in PCT/JP2022/014557, dated Jun. 7, 2022.
Notice of Reasons for Refusal issued in Japanese Application No. 2021-062242, dated May 24, 2022.
Written Opinion issued in Japanese Application No. 2021-062242, dated Aug. 1, 2022.
English translation of International Preliminary Report on Patentability and Written Opinion of the International Searching Authority for International Application No. PCT/JP2022/014557, dated Oct. 12, 2023.

* cited by examiner

REFRIGERATION CYCLE APPARATUS

CROSS REFERENCE TO RELATED APPLICATIONS

This application is a Continuation of PCT International Application No. PCT/JP2022/014557, filed on Mar. 25, 2022, which claims priority under 35 U.S.C. § 119(a) to Patent Application No. JP 2021-062242, filed in Japan on Mar. 31, 2021, all of which are hereby expressly incorporated by reference into the present application.

TECHNICAL FIELD

The present disclosure relates to a refrigeration cycle apparatus.

BACKGROUND ART

Conventionally, as in PTL 1 (S62-80452), a refrigeration cycle apparatus is known in which, in a refrigeration cycle utilizing a non-azeotropic refrigerant mixture containing a plurality of types of refrigerants, the composition ratio of the refrigerant used in the refrigeration cycle is changed by adsorbing a certain type of refrigerant onto an adsorbent, or desorbing a certain type of refrigerant from the adsorbent, in accordance with a desired operation performance or the like.

SUMMARY

A refrigeration cycle apparatus according to a first aspect includes a refrigeration cycle, an adsorption section, and a first bypass flow path. The refrigeration cycle includes a compressor, a radiator, an expansion mechanism, and an evaporator. The refrigeration cycle uses a non-azeotropic refrigerant mixture including a first refrigerant and a second refrigerant. The adsorption section includes an adsorbent. The adsorbent adsorbs the first refrigerant. The adsorbent does not adsorb the second refrigerant, or the adsorption performance of the adsorbent for the second refrigerant is lower than the adsorption performance thereof for the first refrigerant. The adsorption section stores the first refrigerant adsorbed by the adsorbent. The first bypass flow path connects a first end which is a high-pressure part of the refrigeration cycle and a second end which is a low-pressure part of the refrigeration cycle. In the first bypass flow path, the adsorption section and a valve are disposed.

DESCRIPTION OF EMBODIMENTS

Hereinafter, embodiments of the refrigeration cycle apparatus of the present disclosure will be described with reference to the drawings.

The refrigeration cycle apparatus is an apparatus that performs at least one of cooling of an object for temperature adjustment and heating of the object for temperature adjustment by utilizing a vapor compression refrigeration cycle. The refrigeration cycle apparatus of the present disclosure uses a non-azeotropic refrigerant mixture as the refrigerant. As will be described later, the refrigeration cycle apparatus of the present disclosure changes the composition ratio of the refrigerant flowing through the refrigeration cycle depending on conditions.

First Embodiment (1) Overall Outline

Figure 1:
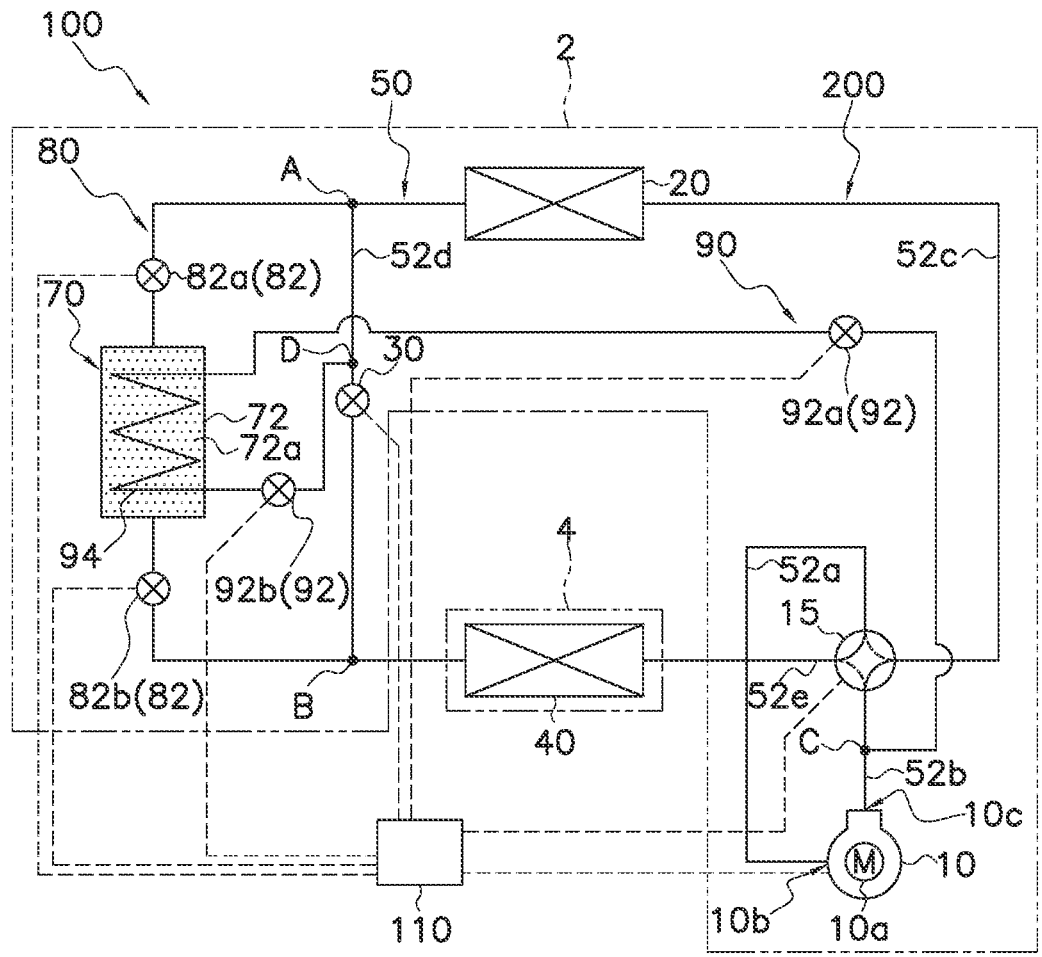
FIG. 1 is a schematic configuration diagram of a refrigeration cycle apparatus according to a first embodiment.

A refrigeration cycle apparatus 100 according to the first embodiment will be described with reference to FIG. 1. FIG. 1 is a schematic configuration diagram of the refrigeration cycle apparatus 100.

Here, the refrigeration cycle apparatus 100 is an air conditioner that performs cooling and heating of air as the object for temperature adjustment. However, this is not a limitation, and the refrigeration cycle apparatus 100 may be an apparatus that performs cooling and heating of a liquid (for example, water) as the object for temperature adjustment.

As shown in FIG. 1, the refrigeration cycle apparatus 100 mainly includes a main refrigerant circuit 50 as an example of a refrigeration cycle, an adsorption section 70, a first bypass flow path 80, a second bypass flow path 90, and a controller 110. The main refrigerant circuit 50, the first bypass flow path 80, and the second bypass flow path 90 are collectively referred to as a refrigerant circuit 200.

The refrigerant circuit 200 including the main refrigerant circuit 50 is filled with a non-azeotropic refrigerant mixture. The non-azeotropic refrigerant mixture is a mixture of at least two types of refrigerants. The refrigerant circuit 200 of the refrigeration cycle apparatus 100 of the first embodiment is filled with a non-azeotropic refrigerant mixture containing only two types of refrigerants (a first refrigerant and a second refrigerant). However, this is not a limitation, and the non-azeotropic refrigerant mixture may be a mixture of three or more refrigerants.

Specifically but without limitation, the first refrigerant is $CO_2$ (carbon dioxide), and the second refrigerant is HFO (hydrofluoroolefin). HFO is a refrigerant having an extremely low global warming potential. Without limitation, a specific example of the HFO for use as the second refrigerant is R1234Ze (cis-1,3,3,3-tetrafluoropropene). Further, for example, instead of R1234Ze, R1234yf (2,3,3,3-tetrafluoropropene) may be used as the FIFO of the second refrigerant. $CO_2$ is a refrigerant that has a relatively low boiling point, and R1234Ze and R1234yf are refrigerants that have relatively high boiling points. Hereinafter, the first refrigerant may be referred to as a low boiling-point refrigerant, and the second refrigerant may be referred to as a high boiling-point refrigerant.

Note that the concentration of $CO_2$ as the first refrigerant contained in the non-azeotropic refrigerant mixture with which the refrigerant circuit 200 is filled is preferably less than or equal to 20% in a state where $CO_2$ as the first refrigerant is not adsorbed in the adsorbent 72a of the adsorption section 70 as will be described later. In other words, the ratio of the total weight of the first refrigerant filled in the refrigerant circuit 200 to the total weight of all the refrigerants filled in the refrigerant circuit 200 is preferably less than or equal to 20 wt %.

The main refrigerant circuit 50, the adsorption section 70, the first bypass flow path 80, the second bypass flow path 90, and the controller 110 will be briefly described.

As shown in FIG. 1, the main refrigerant circuit 50 mainly includes a compressor 10, a flow path switching mechanism 15, a heat-source heat exchanger 20, an expansion mechanism 30, and a utilization heat exchanger 40. The compressor 10, the flow path switching mechanism 15, the heat-source heat exchanger 20, the expansion mechanism 30, and the utilization heat exchanger 40 are connected by refrigerant pipes 52a to 52e, which will be described later, to constitute the main refrigerant circuit 50 (see FIG. 1). The refrigeration cycle apparatus 100 performs cooling and heating of the air as the object for temperature adjustment by circulating the refrigerant through the main refrigerant circuit 50.

As shown in FIG. 1, the first bypass flow path 80 is a flow path of the refrigerant that connects a heat source-side end A of the main refrigerant circuit 50 and a utilization-side end B of the main refrigerant circuit 50. As shown in FIG. 1, the adsorption section 70 is disposed in the first bypass flow path 80. The adsorption section 70 is used to change the composition ratio of the refrigerant flowing through the main refrigerant circuit 50.

As shown in FIG. 1, the second bypass flow path 90 is a refrigerant flow path that connects a high-pressure end C of the main refrigerant circuit 50 and a low-pressure end D of the main refrigerant circuit 50. The second bypass flow path 90 is used to heat the adsorbent 72a of the adsorption section 70 with the refrigerant flowing therein.

Note that, as indicated by long dashed double short-dashed lines in FIG. 1, the refrigeration cycle apparatus 100 includes: a heat source unit 2 having a casing (not shown); and a utilization unit 4 that has a casing (not shown), and that is connected to the heat source unit 2 via refrigerant pipes. The heat source unit 2 is installed, for example, on a rooftop or in a machine chamber of a building in which the refrigeration cycle apparatus 100 is installed, or around the building in which the refrigeration cycle apparatus 100 is installed. The utilization unit 4 is disposed in a space to be air-conditioned or in a space in the vicinity of the space to be air-conditioned (for example, a space above the ceiling, a machine chamber, or the like). Without limitation, the casing of the heat source unit 2 mainly houses: the compressor 10, the flow path switching mechanism 15, the heat-source heat exchanger 20, and the expansion mechanism 30 of the main refrigerant circuit 50; the first bypass flow path 80; and the second bypass flow path 90. The casing of the utilization unit 4 mainly houses the utilization heat exchanger 40 of the main refrigerant circuit 50.

The controller 110 controls the operations of various configurations of the refrigeration cycle apparatus 100.

(2) Detailed Configuration (2-1) Main Refrigerant Circuit

As shown in FIG. 1, the main refrigerant circuit 50 mainly includes the compressor 10, the flow path switching mechanism 15, the heat-source heat exchanger 20, the expansion mechanism 30, and the utilization heat exchanger 40.

As shown in FIG. 1, the main refrigerant circuit 50 includes a suction pipe 52a, a discharge pipe 52b, a first gas refrigerant pipe 52c, a liquid refrigerant pipe 52d, and a second gas refrigerant pipe 52e as pipes for connecting the compressor 10, the flow path switching mechanism 15, the heat-source heat exchanger 20, the expansion mechanism 30, and the utilization heat exchanger 40 (see FIG. 1). The suction pipe 52a connects a suction port 10b of the compressor 10 and the flow path switching mechanism 15. The discharge pipe 52b connects a discharge port 10c of the compressor 10 and the flow path switching mechanism 15. The first gas refrigerant pipe 52c connects the flow path switching mechanism 15 and a gas end of the heat-source heat exchanger 20. The liquid refrigerant pipe 52d connects a liquid end of the heat-source heat exchanger 20 and a liquid end of the utilization heat exchanger 40. The liquid refrigerant pipe 52d is provided with the expansion mechanism 30. The second gas refrigerant pipe 52e connects a gas end of the utilization heat exchanger 40 and the flow path switching mechanism 15.

(2-1-1) Compressor

The compressor 10 suctions a low-pressure refrigerant in the refrigeration cycle from the suction port 10b, compresses the refrigerant in a compression mechanism, not shown, and discharges a high-pressure refrigerant in the refrigeration cycle from the discharge port 10c. Although only one compressor 10 is depicted in FIG. 1, the main refrigerant circuit 50 may include a plurality of compressors 10 connected in series or in parallel.

The compressor 10 is, for example, a scroll compressor. However, this is not a limitation, and the compressor 10 may be a compressor of a type other than the scroll compressor, such as a rotary compressor. The type of the compressor 10 may be selected as appropriate.

Without limitation, the compressor 10 is an inverter-controlled compressor in which the number of revolutions of a motor 10a is variable. The controller 110, which controls the operation of the compressor 10 and will be described later, controls the number of revolutions of the motor 10a of the compressor 10 in accordance with, for example, an air conditioning load.

(2-1-2) Flow Path Switching Mechanism

The flow path switching mechanism 15 is a mechanism that switches the flow direction of the refrigerant through the main refrigerant circuit 50 in accordance with the operation mode (cooling operation mode/heating operation mode) of the refrigeration cycle apparatus 100. The cooling operation mode is an operation mode of the refrigeration cycle apparatus 100 in which the heat-source heat exchanger 20 is caused to function as a radiator and the utilization heat exchanger 40 is caused to function as an evaporator. The heating operation mode is an operation mode of the refrigeration cycle apparatus 100 in which the utilization heat exchanger 40 is caused to function as a radiator and the heat-source heat exchanger 20 is caused to function as an evaporator.

In the cooling operation mode, the flow path switching mechanism 15 switches the flow direction of the refrigerant in the main refrigerant circuit 50 so that the refrigerant discharged by the compressor 10 is sent to the heat-source heat exchanger 20. Specifically, in the cooling operation mode, the flow path switching mechanism 15 causes the suction pipe 52a to communicate with the second gas refrigerant pipe 52e, and causes the discharge pipe 52b to communicate with the first gas refrigerant pipe 52c (see the solid lines in FIG. 1).

In the heating operation mode, the flow path switching mechanism 15 switches the flow direction of the refrigerant in the main refrigerant circuit 50 so that the refrigerant discharged by the compressor 10 is sent to the utilization heat exchanger 40. Specifically, in the heating operation mode, the flow path switching mechanism 15 causes the suction pipe 52a to communicate with the first gas refrigerant pipe 52c, and causes the discharge pipe 52b to communicate with the second gas refrigerant pipe 52e (see the broken lines in FIG. 1).

The flow path switching mechanism 15 is, for example, a four-way switching valve. However, the flow path switching mechanism 15 may be realized by something other than the four-way switching valve. For example, the flow path switching mechanism 15 may be configured by combining a plurality of electromagnetic valves and pipes so as to realize the switching of the flow direction of the refrigerant.

(2-1-3) Heat-Source Heat Exchanger

The heat-source heat exchanger 20 functions as a radiator of the refrigerant when the refrigeration cycle apparatus 100 is operated in the cooling operation mode, and functions as an evaporator of the refrigerant when the refrigeration cycle apparatus 100 is operated in the heating operation mode. Although only one heat-source heat exchanger 20 is depicted in FIG. 1, the main refrigerant circuit 50 may include a plurality of heat-source heat exchangers 20 arranged in parallel.

Without limitation, the heat-source heat exchanger 20 is, for example, a fin-and-tube type heat exchanger having a plurality of heat transfer tubes and a plurality of heat transfer fins.

As shown in FIG. 1, the first gas refrigerant pipe 52c is connected to one end of the heat-source heat exchanger 20. As shown in FIG. 1, the liquid refrigerant pipe 52d is connected to the other end of the heat-source heat exchanger 20.

When the refrigeration cycle apparatus 100 is operated in the cooling operation mode, the refrigerant flows into the heat-source heat exchanger 20 from the first gas refrigerant pipe 52c. The refrigerant that has flowed into the heat-source heat exchanger 20 from the first gas refrigerant pipe 52c dissipates heat by exchanging heat with air supplied by a fan, not shown, and at least some of the refrigerant condenses. The refrigerant that has dissipated heat in the heat-source heat exchanger 20 flows out to the liquid refrigerant pipe 52d.

When the refrigeration cycle apparatus 100 is operated in the heating operation mode, the refrigerant flows into the heat-source heat exchanger 20 from the liquid refrigerant pipe 52d. The refrigerant that has flowed from the liquid refrigerant pipe 52d into the heat-source heat exchanger 20 absorbs heat by exchanging heat with air supplied by a fan, not shown, in the heat-source heat exchanger 20, and evaporates. The refrigerant that has absorbed heat (has been heated) in the heat-source heat exchanger 20 flows out to the first gas refrigerant pipe 52c.

Note that, while in the present embodiment, in the heat-source heat exchanger 20, heat exchange is performed between the refrigerant flowing therein and the air as the heat source supplied to the heat-source heat exchanger 20, the heat-source heat exchanger 20 is not limited to a heat exchanger that performs heat exchange between air and the refrigerant. For example, the heat-source heat exchanger 20 may be a heat exchanger that performs heat exchange between a refrigerant flowing therein and a liquid as a heat source supplied to the heat-source heat exchanger 20.

(2-1-4) Expansion Mechanism

The expansion mechanism 30 is a mechanism that decompresses the refrigerant and adjusts the flow rate of the refrigerant. In this embodiment, the expansion mechanism 30 is an opening-variable electronic expansion valve. The opening degree of the expansion mechanism 30 is adjusted as appropriate in accordance with the operating condition. Note that the expansion mechanism 30 is not limited to the electronic expansion valve, and may be a thermostatic expansion valve or a capillary tube.

(2-1-5) Utilization Heat Exchanger

The utilization heat exchanger 40 functions as an evaporator of the refrigerant when the refrigeration cycle apparatus 100 is operated in the cooling operation mode, and functions as a radiator of the refrigerant when the refrigeration cycle apparatus 100 is operated in the heating operation mode. When functioning as an evaporator, the utilization heat exchanger 40 cools the object for temperature adjustment (air in the present embodiment). When functioning as a radiator, the utilization heal exchanger 40 heats the object for temperature adjustment (air in the present embodiment).

Note that, in the example shown in FIG. 1, the refrigeration cycle apparatus 100 includes only one utilization heat exchanger 40. However, this is not a limitation. The main refrigerant circuit 50 of the refrigeration cycle apparatus 100 may include a plurality of utilization heat exchangers 40 arranged in parallel. Then, each utilization unit 4 may have an expansion mechanism (for example, an electronic expansion valve with an adjustable opening degree), not shown, disposed on the liquid side of the utilization heat exchanger 40.

Without limitation, the utilization heat exchanger 40 is, for example, a fin-and-tube type heat exchanger having a plurality of heat transfer tubes and a plurality of heat transfer fins.

As shown in FIG. 1, the liquid refrigerant pipe 52d is connected to one end of the utilization heat exchanger 40. As shown in FIG. 1, the second gas refrigerant pipe 52e is connected to the other end of the utilization heat exchanger 40.

When the refrigeration cycle apparatus 100 is operated in the cooling operation mode, the refrigerant flows into the utilization heat exchanger 40 from the liquid refrigerant pipe 52d. The refrigerant that has flowed into the utilization heat exchanger 40 from the liquid refrigerant pipe 52d exchanges heat with air supplied by a fan, not shown, absorbs heat, and evaporates in the utilization heat exchanger 40. The refrigerant that has absorbed heat (has been heated) in the utilization heat exchanger 40 flows out to the second gas refrigerant pipe 52e. Note that the air cooled by the utilization heat exchanger 40 as the object for temperature adjustment is blown out to the space to be air-conditioned.

When the refrigeration cycle apparatus 100 is operated in the heating operation mode, the refrigerant flows into the utilization heat exchanger 40 from the second gas refrigerant pipe 52e. The refrigerant that has flowed into the utilization heat exchanger 40 from the second gas refrigerant pipe 52e dissipates heat by exchanging heat with air supplied by a fan, not shown, and at least some of the refrigerant condenses. The refrigerant that has dissipated heat in the utilization heat exchanger 40 flows out to the liquid refrigerant pipe 52d. Note that the air heated by the utilization heat exchanger 40 as the object for temperature adjustment is blown out to the space to be air-conditioned.

(2-2) First Bypass Flow Path

The first bypass flow path 80 is a pipe that connects the heat source-side end A of the main refrigerant circuit 50 and the utilization-side end B of the main refrigerant circuit 50. In the refrigeration cycle apparatus 100 shown in FIG. 1, the heat source-side end A is a portion of the liquid refrigerant pipe 52d of the main refrigerant circuit 50 between the heat-source heat exchanger 20 and the expansion mechanism 30. In the refrigeration cycle apparatus 100 shown in FIG. 1, the utilization-side end B is a portion of the liquid refrigerant pipe 52d of the main refrigerant circuit 50 between the utilization heat exchanger 40 and the expansion mechanism 30.

When the refrigeration cycle apparatus 100 is operated in the cooling mode, the heat source-side end A of the main refrigerant circuit 50 becomes a high-pressure part of the main refrigerant circuit 50, and the utilization-side end B of the main refrigerant circuit 50 becomes a low-pressure part of the main refrigerant circuit 50. When the refrigeration cycle apparatus 100 is operated in the heating mode, the heat source-side end A of the main refrigerant circuit 50 becomes a low-pressure part of the main refrigerant circuit 50, and the utilization-side end B of the main refrigerant circuit 50 becomes a high-pressure part of the main refrigerant circuit 50. In short, when the refrigeration cycle apparatus 100 is operated in the cooling mode, the heat source-side end A is the first end in the claims, and the utilization-side end B is the second end in the claims, Further, when the refrigeration cycle apparatus 100 is operated in the heating mode, the heal source-side end A is the second end in the claims, and the utilization-side end B is the first end in the claims.

Note that, here, the high-pressure part of the main refrigerant circuit 50 means a portion of the main refrigerant circuit 50 from the discharge port 10c of the compressor 10 to the expansion mechanism 30 in the flow direction of the refrigerant. The low-pressure part of the main refrigerant circuit 50 means a portion of the main refrigerant circuit 50 from the expansion mechanism 30 to the suction port 10b of the compressor 10 in the flow direction of the refrigerant.

Figure 4:
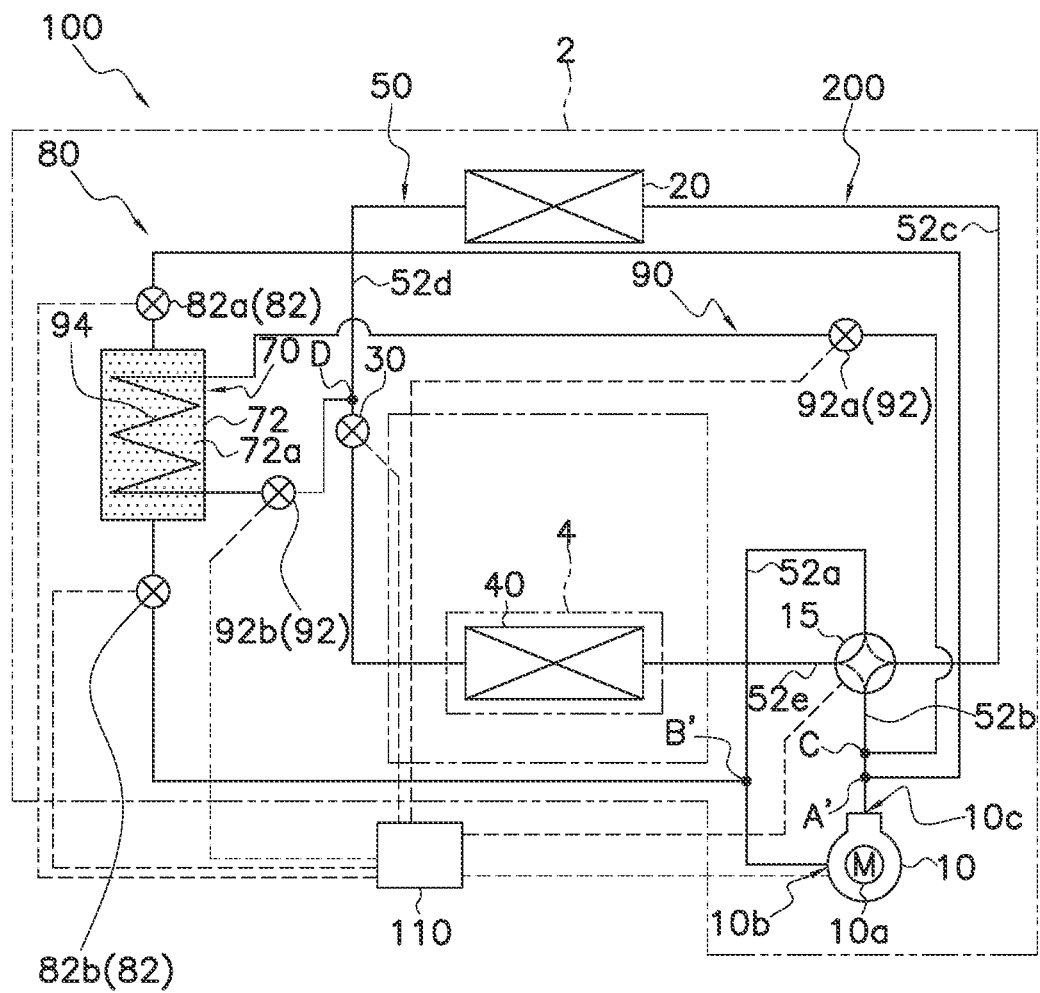
FIG. 4 is a schematic configuration diagram of a refrigeration cycle apparatus according to another example.

Note that the position at which the first bypass flow path 80 is connected is not limited to the position depicted in FIG. 1. For example, as shown in FIG. 4, the first bypass flow path 80 may be connected to an end portion A' provided in the discharge pipe 52b of the main refrigerant circuit 50 and to an end portion B' provided in the suction pipe 52a of the main refrigerant circuit 50. In this case, regardless of the operation mode, the end portion A' becomes the high-pressure part of the main refrigerant circuit 50, and the end portion B' becomes the low-pressure part of the main refrigerant circuit 50. In other words, the end portion A' is an example of the first end in the claims, and the end portion B' is an example of the second end in the claims.

However, as shown in FIG. 1, one end of the first bypass flow path 80 is preferably connected to the heat source-side end A of the portion of the liquid refrigerant pipe 52d between the heat-source heat exchanger 20 and the expansion mechanism 30. The other end of the first bypass flow path 80 is preferably connected to the utilization-side end B of the portion of the liquid refrigerant pipe 52d between the expansion mechanism 30 and the utilization heat exchanger 40. In other words, one end of the first bypass flow path 80 is preferably connected between the radiator (the heat-source heat exchanger 20 in the cooling operation mode, and the utilization heat exchanger 40 in the heating operation mode) and the expansion mechanism 30 in the main refrigerant circuit 50. The other end of the first bypass flow path 80 is preferably connected between the evaporator (the utilization heat exchanger 40 in the cooling operation mode, and the heat-source heat exchanger 20 in the heating operation mode) and the expansion mechanism 30 in the main refrigerant circuit 50.

As shown in FIG. 1, the adsorption section 70 is disposed in the first bypass flow path 80. The adsorption section 70 will be described later.

Valves 82 are disposed in the first bypass flow path 80. The valves 82 are valves that control the flow of the refrigerant in the first bypass flow path 80. The valves 82 include a heat source-side valve 82a, and a utilization-side valve 82b. The heat source-side valve 82a is disposed between the heat source-side end A and the adsorption section 70. The utilization-side valve 82b is disposed between the utilization-side end B and the adsorption section 70. The heat source-side valve 82a and the utilization-side valve 82b are, for example, electronic expansion valves with adjustable opening degrees.

When the refrigeration cycle apparatus 100 is operated in the cooling mode, the heat source-side valve 82a is disposed between the heat source-side end A, which functions as the first end in the claims, and the adsorption section 70, and therefore the heat source-side valve 82a functions as the first valve in the claims. When the refrigeration cycle apparatus 100 is operated in the cooling mode, the utilization-side valve 82b is disposed between the utilization-side end B, which functions as the second end in the claims, and the adsorption section 70, and therefore the utilization-side valve 82b functions as the second valve in the claims.

When the refrigeration cycle apparatus 100 is operated in the heating mode, the heat source-side valve 82a is disposed between the heat source-side end A, which functions as the second end in the claims, and the adsorption section 70, and therefore the heat source-side valve 82a functions as the second valve in the claims. When the refrigeration cycle apparatus 100 is operated in the heating mode, the utilization-side valve 82b is disposed between the utilization-side end B, which functions as the first end in the claims, and the adsorption section 70, and therefore functions as the first valve in the claims.

The valves 82 are opened to allow the refrigerant to flow through the first bypass flow path 80 when the first refrigerant is adsorbed onto the adsorbent 72a of the adsorption section 70, or when the first refrigerant is desorbed from the adsorbent 72a of the adsorption section 70, as will be described later. Control of the heat source-side valve 82a and the utilization-side valve 82b during adsorption and desorption of the first refrigerant will be described later.

(2-3) Adsorption Section

The adsorption section 70 mainly includes the adsorbent 72a and a container 72 filled with the adsorbent 72a. One end of the container 72 is connected to the heat source-side end A via a refrigerant pipe. The other end of the container 72 is connected to the utilization-side end B via a refrigerant pipe.

The adsorbent 72a has a property to adsorb the first refrigerant. In short, in the refrigeration cycle apparatus 100 of the first embodiment, the adsorbent 72a has the property to adsorb $CO_2$. The adsorption section 70 stores the first refrigerant adsorbed by the adsorbent 72a. In other words, the adsorption section 70 does not have a separate container for storing the first refrigerant, hut stores the first refrigerant in the container 72 in which the adsorbent 72a is housed.

Further, the adsorbent 72a has a property not to adsorb the second refrigerant. In short, the adsorbent 72a of the refrigeration cycle apparatus 100 of the first embodiment does not adsorb R1234Ze or R1234yf used as the second refrigerant.

Alternatively, the adsorbent 72a may also adsorb the second refrigerant in addition to the first refrigerant, but may have a property such that the adsorption performance thereof for the second refrigerant is lower than the adsorption performance thereof for the first refrigerant. For example, when the adsorption section 70 adsorbs the non-azeotropic refrigerant mixture containing the first refrigerant and the second refrigerant, the adsorbent 72a mainly adsorbs $CO_2$ as the first refrigerant and hardly adsorbs R1234Ze or R1234yf used as the second refrigerant. When the non-azeotropic refrigerant mixture is adsorbed onto the adsorbent 72a, the refrigerant that passes through the adsorbent 72a and flows out of the container 72 is the sole second refrigerant that does not contain $CO_2$, or a refrigerant mixture with a low concentration of $CO_2$.

The adsorbent 72a is, for example, zeolite having high $CO_2$ adsorption performance. Without limitation, more specific examples of zeolite include zeoliteEMC-2, zeolite13X, and zeoliteSSZ-13. In addition, the adsorbent 72a may be a metal-organic framework (MOF) having high $CO_2$ adsorption performance. Without limitation, more specific examples of the metal-organic framework include MOF-177, $Zn_4O(BTB)_2$, MIL-101, NU-100, PCN-68, DUT-9, DUT-49, MAF-66, LIU-36, and NU-111. Note that the type of the adsorbent 72a is not limited to the above-described adsorbent and may be of any type as long as the adsorbent adsorbs the first refrigerant but does not adsorb the second refrigerant, or as long as the adsorption performance thereof for the second refrigerant is lower than the adsorption performance thereof for the first refrigerant. For example, the adsorbent 72a may be porous carbon, graphene, mesoporous (MCM-41, MCM-48, SBA-15, MBS-1, MBS-2), covalent organic framework COF (COF-102, COF-103), intrinsic microporous polymer (PIM), or the like.

(2-4) Second Bypass Flow Path

The second bypass flow path 90 is a flow path of the refrigerant used for heating the adsorbent 72a of the adsorption section 70 with the refrigerant flowing therein.

The second bypass flow path 90 is a pipe that connects a high-pressure end C of the main refrigerant circuit 50 and a low-pressure end D of the main refrigerant circuit 50. In the refrigeration cycle apparatus 100 shown in FIG. 1, the high-pressure end C is provided in the discharge pipe 52b that connects the discharge port 10c of the compressor 10 and the flow path switching mechanism 15. In the refrigeration cycle apparatus 100 shown in FIG. 1, the low-pressure end D is a portion of the liquid refrigerant pipe 52d between the heat-source heat exchanger 20 and the expansion mechanism 30.

The high-pressure end C is an example of a third end between the discharge port 10c of the compressor 10 and the radiator (the heat-source heat exchanger 20 in the cooling operation mode, and the utilization heat exchanger 40 in the heating operation mode).

The second bypass flow path 90 is used when the refrigeration cycle apparatus 100 is in the heating operation mode, as will be described later. When the refrigeration cycle apparatus 100 is in the heating operation mode, the low-pressure end D is disposed in a portion of the main refrigerant circuit 50 from the expansion mechanism 30 to the suction port 10b of the compressor 10 in the flow direction of the refrigerant. Therefore, the low-pressure end D is an example of a fourth end which is a low-pressure part of the main refrigerant circuit 50.

Note that the position of the main refrigerant circuit 50 at which the second bypass flow path 90 is connected is not limited to the position depicted in FIG. 1. For example, because the second bypass flow path 90 is used when the refrigeration cycle apparatus 100 is in the heating operation mode as will be described later, the high-pressure end C of the second bypass flow path 90 may be provided in the second gas refrigerant pipe 52e disposed between the discharge port 10c of the compressor 10 and the utilization heat exchanger 40 functioning as a radiator. The low-pressure end D of the second bypass flow path 90 may be provided in the suction pipe 52a that connects the flow path switching mechanism 15 and the suction port 10b of the compressor 10.

The second bypass flow path 90 has a heating section 94 for heating the adsorbent 72a of the adsorption section 70 with the refrigerant flowing therein. The heating section 94 is disposed, for example, inside the container 72 of the adsorption section 70. For example, the heating section 94 is a coil-type heat exchanger in which a heat transfer tube, with end portions (refrigerant inlet and outlet) disposed outside the container 72, is wound in a coil shape. Pipes of the second bypass flow path 90 are connected to both ends of the heating section 94. Note that the heating section 94 may not be disposed inside the container 72. For example, as long as the adsorbent 72a can be heated, the heating section 94 may be a coil-type heat exchanger disposed to surround the container 72.

Valves 92 are disposed in the second bypass flow path 90. The valves 92 are an example of the third valve in the claims. The valves 92 control the flow of the refrigerant in the second bypass flow path 90. The valves 92 include a high pressure-side valve 92a and a low pressure-side valve 92b. The high pressure-side valve 92a, is disposed between the high-pressure end C and the heating section 94. The low pressure-side valve 92b is disposed between the low-pressure end D and the heating section 94. The high pressure-side valve 92a and the low pressure-side valve 92b are, for example, opening-variable electronic expansion valves with. Control of the high pressure-side valve 92a and the low pressure-side valve 92b during desorption of the first refrigerant will be described later.

(2-5) Controller

The controller 110 is a control unit for controlling the operations of various devices of the refrigeration cycle apparatus 100.

The controller 110 mainly includes, for example, a microcontroller unit (MCU) and various electric circuits and electronic circuits (not shown). The MCU includes a CPU, a memory, an I/O interface, and the like. Various programs to be executed by the CPU of the MCU are stored in the memory of the MCU. For the controller 110, an FPGA or an ASIC may be utilized. Note that the various functions of the controller 110 need not be implemented by software, and may be implemented by hardware or by cooperation of hardware and software.

The controller 110 may be a device independent of the heat source unit 2 and the utilization unit 4. Further, the controller 110 may not be a device independent of the heat source unit 2 and the utilization unit 4, and, for example, a control unit (not shown) mounted in the heat source unit 2 and a control unit (not shown) mounted in the utilization unit 4 may cooperate with each other to function as the controller 110.

The controller 110 is electrically connected to the compressor 10, the flow path switching mechanism 15, and the expansion mechanism 30 of the main refrigerant circuit 50, and controls the operations of the compressor 10, the flow path switching mechanism 15, and the expansion mechanism 30 (see FIG. 1). Further, the controller 110 is electrically connected to a fan (not shown) for supplying air to the heat-source heat exchanger 20 of the heat source unit 2, and to a fan (not shown) for supplying air to the utilization heat exchanger 40 of the utilization unit 4 so as to be able to control the operation of these fans. The controller 110 is electrically connected to the heat source-side valve 82*a* and the utilization-side valve 82*b* of the first bypass flow path 80, and controls the operations of the heat source-side valve 82*a* and the utilization-side valve 82*b* (see FIG. 1). Further, the controller 110 is electrically connected to the high-pressure side valve 92*a* and the low-pressure side valve 92*b* of the second bypass flow path 90, and controls the operations of the high-pressure side valve 92*a* and the low-pressure side valve 92*b*. In addition, the controller 110 is connected to the remote controller, not shown, communicatively in a wired or wireless manner. The remote controller is used by a user of the refrigeration cycle apparatus 100 to instruct the operation of the refrigeration cycle apparatus 100. Further, the controller 110 is electrically connected to sensors, not shown, disposed at various locations of the refrigeration cycle apparatus 100, and can acquire measurement values of these sensors. Without limitation, the sensors of the refrigeration cycle apparatus 100 include sensors that measure the temperature and pressure of the refrigerant, and sensors that measure the temperatures of the space to be air-conditioned and the heat source air.

The controller 110 executes various types of control by, for example, the CPU executing a program stored in the memory. For example, when the refrigeration cycle apparatus 100 performs the cooling operation or the heating operation, the controller 110 controls the operations of various devices of the refrigeration cycle apparatus 100.

Hereinafter, control of the operations of various devices of the refrigeration cycle apparatus by the controller 110 without consideration of adsorption control and desorption control of the first refrigerant will be described, and thereafter, adsorption control and desorption control of the first refrigerant executed by the controller 110 will be described.

(2-5-1) Cooling Operation

The controller 110 executes the cooling operation when execution of the cooling operation is instructed from the remote controller, not shown, or if it is determined that execution of the cooling operation is necessary in view of the temperature of the space to be air-conditioned.

During the cooling operation, the controller 110 controls the operation of the flow path switching mechanism 15 such that the heat-source heat exchanger 20 functions as a radiator of the refrigerant and the utilization heat exchanger 40 functions as an evaporator of the refrigerant. In addition, the controller 110 starts the operation of the compressor 10 and the fans, not shown, mounted in the heat source unit 2 and the utilization unit 4. Further, the controller 110 adjusts the number of revolutions of the motor 10*a* of the compressor 10, the number of revolutions of the fans mounted in the heat source unit 2 and the utilization unit 4, and the opening degree of the electronic expansion valve as the expansion mechanism 30, based on the measurement values of the various sensors of the refrigeration cycle apparatus 100, the target temperature of the space to be air-conditioned set by the user, and the like.

(2-5-2) Heating Operation

The controller 110 executes the heating operation when an instruction to execute the heating operation is given from the remote controller, not shown, or if it is determined that the execution of the heating operation is necessary in view of the temperature of the space to be air-conditioned.

During the heating operation, the controller 110 controls the operation of the flow path switching mechanism 15 such that the heat-source heat exchanger 20 functions as an evaporator of the refrigerant and the utilization heat exchanger 40 functions as a radiator of the refrigerant. In addition, the controller 110 starts the operation of the compressor 10 and the fans, not shown, mounted in the heat source unit 2 and the utilization unit 4. Further, the controller 110 adjusts the number of revolutions of the motor 10*a* of the compressor 10, the number of revolutions of the fans mounted in the heat source unit 2 and the utilization unit 4, and the opening degree of the electronic expansion valve as the expansion mechanism 30, based on the measurement values of the various sensors of the refrigeration cycle apparatus 100, the target temperature of the space to be air-conditioned set by the user, and the like.

Note that, when frost formation on the heat-source heat exchanger 20 is detected during the heating operation, the controller 110 interrupts the heating operation, controls the operation of the flow path switching mechanism 15, switches the flow direction of the refrigerant in the main refrigerant circuit 50 to the same direction as during the cooling operation, and performs a defrost operation (reverse cycle defrost operation). The defrost operation is an operation for removing frost attached to the heat-source heat exchanger 20. Because the defrost operation of the refrigeration cycle apparatus is generally known, detailed description of the defrost operation will be omitted.

(2-5-3) Adsorption Control and Desorption Control

The adsorption control and the desorption control will be described.

The adsorption control is control for adsorbing the first refrigerant onto the adsorbent 72*a* of the adsorption section 70 to reduce the concentration of the first refrigerant in the non-azeotropic refrigerant mixture flowing through the main refrigerant circuit 50. The desorption control is control for desorbing the first refrigerant adsorbed in the adsorbent 72*a* to increase the concentration of the first refrigerant in the non-azeotropic refrigerant mixture flowing through the main refrigerant circuit 50.

As a premise of the following description, in the refrigeration cycle apparatus 100 of the first embodiment, when the cooling operation is performed, the second refrigerant is substantially solely circulated through the main refrigerant circuit 50. In other words, in the refrigeration cycle apparatus 100, when the utilization heat exchanger 40 is utilized as an evaporator, the second refrigerant is substantially solely circulated through the main refrigerant circuit 50. Circulating the second refrigerant substantially solely through the main refrigerant circuit 50 includes circulating a non-azeotropic refrigerant mixture having a low concentration of the first refrigerant through the main refrigerant circuit 50, in addition to circulating a refrigerant that does not contain the first refrigerant therethrough. Note that the non-azeotropic refrigerant mixture in which the concentration of the first refrigerant is low is, for example, a non-azeotropic refrigerant mixture in which the concentration of the first refrigerant is less than or equal to 5 wt %, Preferably, the non-azeotropic refrigerant mixture in which the concentration of the first refrigerant is low is a non-azeotropic refrigerant mixture in which the concentration of the first refrigerant is less than or equal to 2 wt %, By utilizing the adsorbent 72*a*, the refrigeration cycle apparatus 100 can remove most of the first refrigerant from the refrigerant flowing through the main refrigerant circuit 50 and cause a substantially sole second refrigerant to flow through the main refrigerant circuit 50.

On the other hand, when the heating operation is performed in the refrigeration cycle apparatus 100, the non-azeotropic refrigerant mixture of the first refrigerant and the second refrigerant is circulated through the main refrigerant circuit 50. In other words, when the utilization heal exchanger 40 is utilized as a radiator in the refrigeration cycle apparatus 100, the non-azeotropic refrigerant mixture of the first refrigerant and the second refrigerant is circulated through the main refrigerant circuit 50. In the refrigeration cycle apparatus 100, during the heating operation, all or nearly all of the first refrigerant adsorbed in the adsorbent 72a is desorbed, for example. For example, the concentration of the first refrigerant in the non-azeotropic refrigerant mixture flowing through the main refrigerant circuit 50 when the refrigeration cycle apparatus 100 performs the heating operation is, without limitation, 15 wt %. Note that the concentration of the first refrigerant in the non-azeotropic refrigerant mixture flowing through the main refrigerant circuit 50 when the refrigeration cycle apparatus 100 performs the heating operation may be lower than 15 wt % or higher than 15 wt %. However, the concentration of the first refrigerant in the non-azeotropic refrigerant mixture flowing through the main refrigerant circuit 50 is preferably less than or equal to 20 wt %.

Before describing the adsorption control and the desorption cannot in the refrigeration cycle apparatus 100, the reason for switching the operation of circulating the second refrigerant substantially solely through the main refrigerant circuit 50 and the operation of circulating the non-azeotropic refrigerant mixture of the first refrigerant and the second refrigerant through the main refrigerant circuit 50 will be described.

When the second refrigerant (high boiling-point refrigerant) such as R1234Ze or R1234yf is used, the refrigeration cycle apparatus 100 can be operated relatively efficiently. However, when a high boiling-point refrigerant is utilized, capacity shortage may occur when the heating operation is performed at a low outside-air temperature. In this respect, by using a non-azeotropic refrigerant mixture in which the first refrigerant (low boiling-point refrigerant) such as $CO_2$ is mixed with the high boiling-point refrigerant, it is possible to compensate for the capacity shortage. However, when the non-azeotropic refrigerant mixture in which the first refrigerant is mixed with the second refrigerant is used, there is a problem that the efficiency is lowered compared with the case where the second refrigerant is used solely.

Therefore, here, the second refrigerant is circulated substantially solely through the main refrigerant circuit 50 during the cooling operation, and the non-azeotropic refrigerant mixture of the first refrigerant and the second refrigerant is circulated through the main refrigerant circuit 50 during the heating operation. In other words, during the cooling operation and the heating operation, the refrigeration cycle apparatus 100 changes the composition ratio of the refrigerant flowing through the main refrigerant circuit 50 to a composition ratio suitable for each operation. Accordingly, the refrigeration cycle apparatus 100 can be operated with high efficiency during the cooling operation while securing the capacity for the heating operation.

(A) Adsorption Control

Control (adsorption control) of various devices of the refrigeration cycle apparatus 100 executed by the controller 110 in order to circulate the second refrigerant substantially solely through the main refrigerant circuit 50 during the cooling operation will be described with reference to an example of a flowchart of the adsorption control of FIG. 2.

The adsorption control is executed when, after the refrigeration cycle apparatus 100 has executed the heating operation, the operation mode of the refrigeration cycle apparatus 100 is switched from the heating operation mode to the cooling operation mode. In other words, at the time of execution of step S1 in the flowchart of FIG. 2, the refrigeration cycle apparatus 100 is in the heating operation or is stopped after the heating operation (without performing the cooling operation).

In step S1, the controller 110 determines whether execution of the cooling operation is instructed from the remote controller (not shown). Further, in step S1, the controller 110 may determine by itself whether execution of the cooling operation is necessary based on the temperature of the space to be air-conditioned and the setting temperature, without depending on the instruction from the remote controller. If the controller 110 determines that execution of the cooling operation is being instructed from the remote controller or determines that execution of the cooling operation is necessary, the process proceeds to step S2. Step S1 is repeatedly executed until the controller 110 determines that execution of the cooling operation is being instructed from the remote controller or determines that execution of the cooling operation is necessary.

In step S2, the controller 110 controls the operations of various devices of the refrigeration cycle apparatus 100 such that the refrigeration cycle apparatus 100 starts the cooling operation. Because the control of the operations of the various devices of the refrigeration cycle apparatus 100 during the cooling operation by the controller 110 has been described above, the description thereof will be omitted here.

Next, the controller 110 opens the heat source-side valve 82a in step S3, and opens the utilization-side valve 82b in step S4. Note that the order in which step S3 and step S4 are executed may be reversed, or step S3 and step S4 may be executed simultaneously. Note that, at this time, the controller 110 adjusts the opening degrees of the heat source-side valve 82a and the utilization-side valve 82b so that the flow path area of the heat source-side valve 82a functioning as the first valve is larger than the flow path area of the utilization-side valve 82b functioning as the second valve. For example, when the heat source-side valve 82a and the utilization-side valve 82b are valves of the same specifications, the controller 110 adjusts the opening degree of the heat source-side valve 82a to be larger than the opening degree of the utilization-side valve 82b. Further, for example, if the size of the heat source-side valve 82a (the flow path area of the valve body when fully opened) is larger than the size of the utilization-side valve 82b (the flow path area of the valve body when fully opened), the controller 110 may adjust the opening degrees of the heat source-side valve 82a and the utilization-side valve 82b so that both the heat source-side valve 82a and the utilization-side valve 82b are fully opened. Note that the reason for making the flow path area of the heat source-side valve 82a larger than the flow path area of the utilization-side valve 82b is to increase the pressure in the container 72 of the adsorption section 70 and to promote adsorption of the first refrigerant onto the adsorbent 72a.

When the heat source-side valve 82a and the utilization-side valve 82b are opened in step S3 and step S4, some of the refrigerant flowing through the liquid refrigerant pipe 52d (the high-pressure part of the refrigeration cycle) flows into the first bypass flow path 80 from the heat source-side end A, and flows into the adsorption section 70. In the adsorption section 70, at least some of the first refrigerant is removed from the refrigerant mixture of the first refrigerant and the second refrigerant that has flowed into the adsorption section 70, and the high-concentration second refrigerant flows into the liquid refrigerant pipe 52d (the low-pressure part of the refrigeration cycle) from the utilization-side end B. As a result, the concentration of the second refrigerant in the refrigerant flowing through the main refrigerant circuit 50 increases as time elapses.

In step S5, it is determined whether a predetermined time has elapsed since the heat source-side valve 82a and the utilization-side valve 82b were opened in step S3 and step S4. As the predetermined time, the time required before a state in which the non-azeotropic refrigerant mixture containing the first refrigerant of a predetermined concentration flows through the main refrigerant circuit 50 becomes a state in which the second refrigerant flows substantially solely through the main refrigerant circuit 50 is used. For example, the predetermined time may be determined by performing an experiment in advance, or may be theoretically obtained.

If it is determined in step S5 that the predetermined time has elapsed since the heat source-side valve 82a and the utilization-side valve 82b were opened in step S3 and step S4, the controller 110 closes the heat source-side valve 82a in step S6, and closes the utilization-side valve 82b in step S7. Note that the order of step S6 and step S7 may be reversed, or step S6 and step S7 may be executed simultaneously.

Thus, the adsorption control ends. Note that the cooling operation is continued even after the end of the adsorption control until termination of the cooling operation is instructed or until a state is reached where the cooling operation is unnecessary.

Note that in the defrost operation performed after the heating operation is interrupted, the refrigerant also flows through the main refrigerant circuit 50 in the same direction as in the cooling operation. The controller 110 may also perform the adsorption control for changing the composition ratio of the refrigerant by the above-described method during the defrost operation. Further, the controller 110 may not perform the adsorption control during the defrost operation. Note that, when the controller 110 performs the adsorption control during the defrost operation, the controller 110 performs the desorption control when the heating operation is resumed after the end of the defrost operation, as will be described below.

(B) Desorption Control

Figure 3:
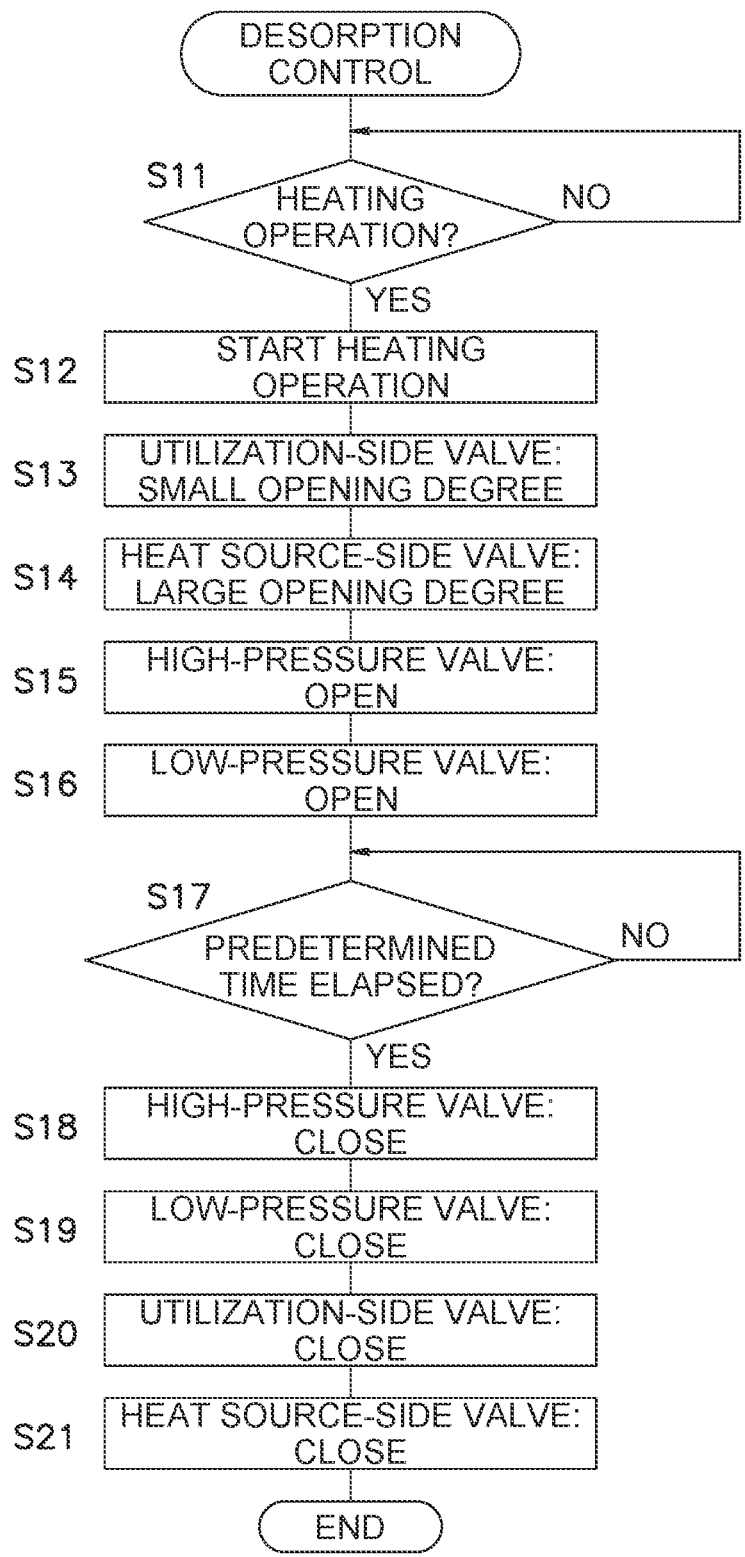
FIG. 3 is an example of a flowchart of desorption control in the refrigeration cycle apparatus of FIG. 1.

Control (desorption control) of various devices of the refrigeration cycle apparatus 100 executed by the controller 110 to circulate the non-azeotropic refrigerant mixture of the first refrigerant and the second refrigerant through the main refrigerant circuit 50 during the heating operation will be described with reference to an example of a flowchart of the desorption control in FIG. 3.

The desorption control is executed when the refrigeration cycle apparatus 100, having executed the cooling operation, switches the operation mode from the cooling operation mode to the heating operation mode. In other words, at the time of execution of step S11 in the flowchart of FIG. 3, the refrigeration cycle apparatus 100 is in the cooling operation or is stopped after the cooling operation (without performing the heating operation).

In step S11, the controller 110 determines whether execution of the heating operation is instructed from the remote controller, not shown. Further, in step S11, the controller 110 may determine by itself whether execution of the heating operation is necessary based on the temperature of the space to be air-conditioned and the setting temperature, without depending on the instruction from the remote controller. If the controller 110 determines that execution of the heating operation is being instructed from the remote controller or determines that execution of the heating operation is necessary, the process proceeds to step S12. Step S11 is repeatedly executed until the controller 110 determines that execution of the heating operation is being instructed from the remote controller or determines that execution of the heating operation is necessary.

In step S12, the controller 110 controls the operations of various devices of the refrigeration cycle apparatus 100 so that the refrigeration cycle apparatus 100 starts the heating operation. Because the control of the operations of the various devices of the refrigeration cycle apparatus 100 during the heating operation by the controller 110 has been described above, the description thereof will be omitted here.

Next, the controller 110 opens the utilization-side valve 82b in step S13, and opens the heat source-side valve 82a in step S14, Note that the order in which step S13 and step S14 are executed may be reversed, or step S13 and step S14 may be executed simultaneously. Note that, at this time, the controller 110 adjusts the opening degrees of the heat source-side valve 82a and the utilization-side valve 82b so that the flow path area of the heat source-side valve 82a, which is an example of the second valve, is larger than the flow path area of the utilization-side valve 82b, which is an example of the first valve. For example, when the heat source-side valve 82a and the utilization-side valve 82b are valves of the same specifications, the controller 110 adjusts the opening degree of the heat source-side valve 82a to be larger than the opening degree of the utilization-side valve 82b. For example, if the size of the heat source-side valve 82a, (the flow path area of the valve body when fully opened) is larger than the size of the utilization-side valve 82b (the flow path area of the valve body when fully opened), the controller 110 may adjust the opening degrees of the heat source-side valve 82a and the utilization-side valve 82b so that both the heat source-side valve 82a and the utilization-side valve 82b are fully opened. Note that the reason for making the flow path area of the heat source-side valve 82a larger than the flow path area of the utilization-side valve 82b is to reduce the pressure in the container 72 of the adsorption section 70 and to promote the desorption of the first refrigerant from the adsorbent 72a.

Further, the controller 110 opens the high pressure-side valve 92a in step S15, and opens the low pressure-side valve 92b in step S16. Note that the order in which step S15 and step S16 are executed may be reversed, or step S15 and step S16 may be executed simultaneously. As a result of opening the high-pressure side valve 92a and the low-pressure side valve 92b, the high-temperature refrigerant discharged from the compressor 10 flows through the second bypass flow path 90 from the high-pressure end C to the low-pressure end D. As a result of the refrigerant flowing through the second bypass flow path 90, the adsorbent 72a of the adsorption section 70 is heated by heat of the refrigerant flowing through the heating section 94. As a result, desorption of the first refrigerant from the adsorbent 72a is promoted.

When the heat source-side valve 82a and the utilization-side valve 82b are opened in step S13 and step S14, some of the refrigerant flowing through the liquid refrigerant pipe 52d (the high-pressure part of the refrigeration cycle) flows into the first bypass flow path 80 from the utilization-side end B, and flows into the adsorption section 70. In the adsorption section 70, the first refrigerant desorbed from the adsorbent 72a is mixed with the refrigerant that has flowed into the adsorption section 70. As a result, a refrigerant containing the first refrigerant at a higher concentration than the refrigerant flowing into the adsorption section 70 flows into the liquid refrigerant pipe 52d (the low-pressure part of the refrigeration cycle) from the heat source-side end A. As a result, the concentration of the first refrigerant in the refrigerant flowing through the main refrigerant circuit 50 increases as time elapses.

In step S17, it is determined whether a predetermined time has elapsed since the heat source-side valve 82a and the utilization-side valve 82b were opened in step S13 and step S14. As the predetermined time here, the time required before a state where the second refrigerant flows substantially solely through the main refrigerant circuit 50 becomes a state where the non-azeotropic refrigerant mixture containing the first refrigerant at a predetermined concentration flows through the main refrigerant circuit 50 is used. For example, the predetermined time may be determined by performing an experiment in advance, or may be theoretically obtained.

If it is determined in step S17 that the predetermined time has elapsed since the heat source-side valve 82a and the utilization-side valve 82b were opened in step S13 and step S14, the controller 110 closes the high pressure-side valve 92a in step S18, closes the low pressure-side valve 92b in step S19, closes the utilization-side valve 82b in step 20, and closes the heat source-side valve 82a in step S21. Note that the order of closing the valves 92a, 92b, 82a, 82b may be changed as appropriate, and at least some of the valves 92a, 92b, 82a, 82b may be closed simultaneously.

Thus, the desorption control ends. The heating operation is continued even after the end of the adsorption control until termination of the heating operation is instructed or until a state is reached where the cooling operation is unnecessary.

(3) Features 3-1

The refrigeration cycle apparatus 100 includes the main refrigerant circuit 50 as an example of the refrigeration cycle, the adsorption section 70, and the first bypass flow path 80. The main refrigerant circuit 50 includes the compressor 10, the radiator, the expansion mechanism 30, and the evaporator. The main refrigerant circuit 50 uses the non-azeotropic refrigerant mixture containing the first refrigerant and the second refrigerant. The adsorption section 70 includes the adsorbent 72a. The adsorbent 72a adsorbs the first refrigerant. The adsorbent 72a does not adsorb the second refrigerant, or the adsorption performance thereof for the second refrigerant is lower than the adsorption performance thereof for the first refrigerant. The adsorption section 70 stores the first refrigerant adsorbed by the adsorbent 72a. The first bypass flow path 80 connects the first end, which is the high-pressure part of the main refrigerant circuit 50, and the second end, which is the low-pressure part of the main refrigerant circuit 50. The adsorption section 70 and the valves 82 are disposed in the first bypass flow path 80.

Note that, when the refrigeration cycle apparatus 100 executes the cooling operation, the heat-source heat exchanger 20 is the radiator, the utilization heat exchanger 40 is the evaporator, the heat source-siege end A is the first end, and the utilization-side end B is the second end. When the refrigeration cycle apparatus 100 executes the heating operation, the heat-source heat exchanger 20 is the evaporator, the utilization heat exchanger 40 is the radiator, the heat source-side end A is the second end, and the utilization-side end B is the first end.

In the refrigeration cycle apparatus 100, because the first refrigerant can be adsorbed onto and desorbed from the adsorbent 72a by utilizing a pressure, the composition ratio of the refrigerant can be changed in a relatively short time.

Further, in the refrigeration cycle apparatus 100, the first refrigerant can be desorbed from the adsorbent 72a while performing a normal operation. Therefore, the time in which the normal operation cannot be performed due to the change in the composition ratio of the refrigerant can be shortened.

Furthermore, in the refrigeration cycle apparatus 100, because the first refrigerant is stored in the adsorbent 72a (the pores of the adsorbent 72a or the like), a container for storing the liquefied first refrigerant other than the container 72, equipment for liquefying the first refrigerant, and the like are not required.

In addition, in the refrigeration cycle apparatus of the present disclosure, because the adsorbent 72a is utilized to adjust the composition ratio of the non-azeotropic refrigerant mixture, it is possible to realize the apparatus by means of a simple configuration and to accurately adjust the composition ratio of the non-azeotropic refrigerant mixture, compared with a case where the composition ratio is adjusted by distillation or gas-liquid separation.

3-2

In the refrigeration cycle apparatus 100, the second end of the first bypass flow path 80 is located between the expansion mechanism 30 and the evaporator of the main refrigerant circuit 50.

Specifically, when the refrigeration cycle apparatus 100 executes the cooling operation, the utilization-side end B functioning as the second end of the first bypass flow path 80 is disposed between the expansion mechanism 30 and the utilization heat exchanger 40 functioning as the evaporator in the main refrigerant circuit 50. When the refrigeration cycle apparatus 100 executes the heating operation, the heat source-side end A functioning as the second end of the first bypass flow path 80 is disposed between the expansion mechanism 30 and the heat-source heat exchanger 20 functioning as an evaporator in the main refrigerant circuit 50.

3-3

In the refrigeration cycle apparatus 100, the first end of the first bypass flow path 80 is disposed between the radiator and the expansion mechanism 30 of the main refrigerant circuit 50.

Specifically, when the refrigeration cycle apparatus 100 executes the cooling operation, the heat source-side end A functioning as the first end of the first bypass flow path 80 is disposed between the heat-source heat exchanger 20 functioning as a radiator and the expansion mechanism 30 in the main refrigerant circuit 50. When the refrigeration cycle apparatus 100 executes the heating operation, the utilization-side end B functioning as the first end of the first bypass flow path 80 is disposed between the utilization heat exchanger 40 functioning as the condenser and the expansion mechanism 30 in the main refrigerant circuit 50.

When the refrigerant is adsorbed onto the adsorbent 72a, adsorption heat is generated. Accordingly, when the temperature of the first refrigerant is high, the first refrigerant is less likely to be adsorbed onto the adsorbent 72a.

In the refrigeration cycle apparatus 100, because the refrigerant cooled by the radiator flows through the adsorbent 72a, the first refrigerant is more likely to be adsorbed onto the adsorbent 72a compared with a case where the refrigerant immediately after being discharged from the compressor 10 flows through the adsorbent 72a.

3-4

In the refrigeration cycle apparatus 100, the main refrigerant circuit 50 includes the utilization heat exchanger 40. The utilization heat exchanger 40 cools the object for temperature adjustment when functioning as an evaporator, and heats the object for temperature adjustment when functioning as a radiator. When the utilization heat exchanger 40 is utilized as the evaporator, the valves 82 of the first bypass flow path 80 are opened so that the adsorbent 72a adsorbs the first refrigerant. When the utilization heat exchanger 40 is utilized as the radiator, the valves 82 of the first bypass flow path 80 are opened so that the adsorbent 72a desorbs the first refrigerant.

In the refrigeration cycle apparatus 100, a refrigerant having a suitable composition can be utilized for each of the case where the utilization heat exchanger 40 functions as an evaporator and the case where the utilization heat exchanger 40 functions as a radiator.

3-5

In the refrigeration cycle apparatus 100, the valves 82 of the first bypass flow path 80 include the first valve disposed between the first end and the adsorption section 70, and the second valve disposed between the adsorption section 70 and the second end. When the refrigeration cycle apparatus 100 executes the cooling operation, the heat source-side valve 82a disposed between the heat source-side end A and the adsorption section 70 is the first valve, and the utilization-side valve 82b disposed between the adsorption section 70 and the utilization-side end B is the second valve. When the refrigeration cycle apparatus 100 executes the heating operation, the utilization-side valve 82b disposed between the utilization-side end B and the adsorption section 70 is the first valve, and the heat source-side valve 82a disposed between the adsorption section 70 and the heat source-side end A is the second valve.

In the refrigeration cycle apparatus 100, by providing valves between the first end and the adsorption section 70 and between the adsorption section 70 and the second end, adsorption of the first refrigerant onto the adsorbent 72a and desorption of the first refrigerant from the adsorbent 72a can be appropriately controlled, and the composition ratio of the refrigerant can be changed in a short time.

3-6

In the refrigeration cycle apparatus 100, in a case where making the adsorbent 72a adsorb the first refrigerant, the first and second valves are opened, and the opening degrees of the first and second valves are adjusted such that the flow path area of the first valve is larger than the flow path area of the second valve. In a case where making the adsorbent 72a desorb the first refrigerant, the first and second valves are opened, and the opening degrees of the first and second valves are adjusted such that the flow path area of the second valve is larger than the flow path area of the first valve.

Specifically, when the first refrigerant is adsorbed onto the adsorbent 72a in the refrigeration cycle apparatus 100, the heat source-side valve 82a and the utilization-side valve 82b are opened, and the opening degrees of the heat source-side valve 82a and the utilization-side valve 82b are adjusted such that the flow path area of the heat source-side valve 82a is larger than the flow path area of the utilization-side valve 82b. For example, if the heat source-side valve 82a and the utilization-side valve 82b have the same specifications, the opening degrees of the heat source-side valve 82a and the utilization-side valve 82b are adjusted such that the opening degree of the heat source-side valve 82a is larger than the opening degree of the utilization-side valve 82b.

In the refrigeration cycle apparatus 100, when the first refrigerant is desorbed from the adsorbent 72a, the heat source-side valve 82a and the utilization-side valve 82b are opened, and the opening degrees of the heat source-side valve 82a and the utilization-side valve 82b are adjusted such that the flow path area of the heat source-side valve 82a is larger than the flow path area of the utilization-side valve 82b. For example, if the heat source-side valve 82a and the utilization-side valve 82b have the same specifications, the opening degrees of the heat source-side valve 82a and the utilization-side valve 82b are adjusted such that the opening degree of the heat source-side valve 82a is larger than the opening degree of the utilization-side valve 82b.

In the refrigeration cycle apparatus 100, during adsorption of the first refrigerant, the flow path area of the first valve is opened to be larger than the flow path area of the second valve, and thus the pressure of the adsorption section 70 becomes relatively high. Accordingly, the first refrigerant can be efficiently adsorbed onto the adsorbent 72a by utilizing the pressure.

Further, in the refrigeration cycle apparatus 100, during desorption of the first refrigerant, the flow path area of the second valve is opened to be larger than the flow path area of the first valve, and thus the pressure of the adsorption section 70 becomes relatively low. Accordingly, the first refrigerant can be efficiently desorbed from the adsorbent 72a.

3-7

The refrigeration cycle apparatus 100 includes the second bypass flow path 90. The second bypass flow path 90 connects the high-pressure end C, which is an example of the third end, and the low-pressure end D, which is an example of the fourth end. The high-pressure end C is disposed between the compressor 10 and the radiator of the main refrigerant circuit 50. In this embodiment, the high-pressure end C is a portion of the discharge pipe 52b of the main refrigerant circuit 50. The low-pressure end D is the low-pressure part of the main refrigerant circuit 50. In the present embodiment, the low-pressure end D is disposed between the expansion mechanism 30 and the suction port 10b of the compressor 10 of the main refrigerant circuit 50. The second bypass flow path 90 heats the adsorption section 70 with the flowing refrigerant. The valve 92 as an example of the third valve is disposed in the second bypass flow path 90. The valves 92 control the flow of the refrigerant in the second bypass flow path 90. When the first refrigerant is desorbed from the adsorbent 72a, the valves 92 are opened.

In the refrigeration cycle apparatus 100, the high-temperature refrigerant discharged by the compressor 10 can be used to heat the adsorbent 72a of the adsorption section 70 and to promote desorption of the first refrigerant from the adsorbent 72a.

3-8

In the refrigeration cycle apparatus 100, the first refrigerant is $CO_2$.

In the refrigeration cycle apparatus 100, because the $CO_2$ is stored in the adsorbent 72a, a storage tank for $CO_2$ and cooling equipment for liquefying $CO_2$ are not required, unlike in a case where $CO_2$ is liquefied and stored in a storage tank.

3-9

In the refrigeration cycle apparatus 100, in a state where $CO_2$ as the first refrigerant is not adsorbed in the adsorbent 72a, the concentration of $CO_2$ as the first refrigerant contained in the non-azeotropic refrigerant mixture is less than or equal to 20 wt %.

In the refrigeration cycle apparatus 100, by making the concentration of $CO_2$ less than or equal to 20 wt %, all of the $CO_2$ can be adsorbed onto the adsorbent 72a while suppressing an increase in the size of the adsorption section 70. Accordingly, it is possible to change the composition ratio of the refrigerant in accordance with the operating conditions while suppressing an increase in the size of the refrigeration cycle apparatus 100.

3-10

In the refrigeration cycle apparatus 100, the adsorbent 72a is a metal-organic framework (MOF) or zeolite having high $CO_2$ adsorption performance.

3-11

In the refrigeration cycle apparatus 100, the second refrigerant is an FIFO refrigerant.

In the refrigeration cycle apparatus 100 according to the eleventh aspect, it is possible to realize the refrigeration cycle apparatus 100 having a low environmental load by using the HFO refrigerant that has a low global warming potential.

Second Embodiment (1) Overall Outline

Figure 5:
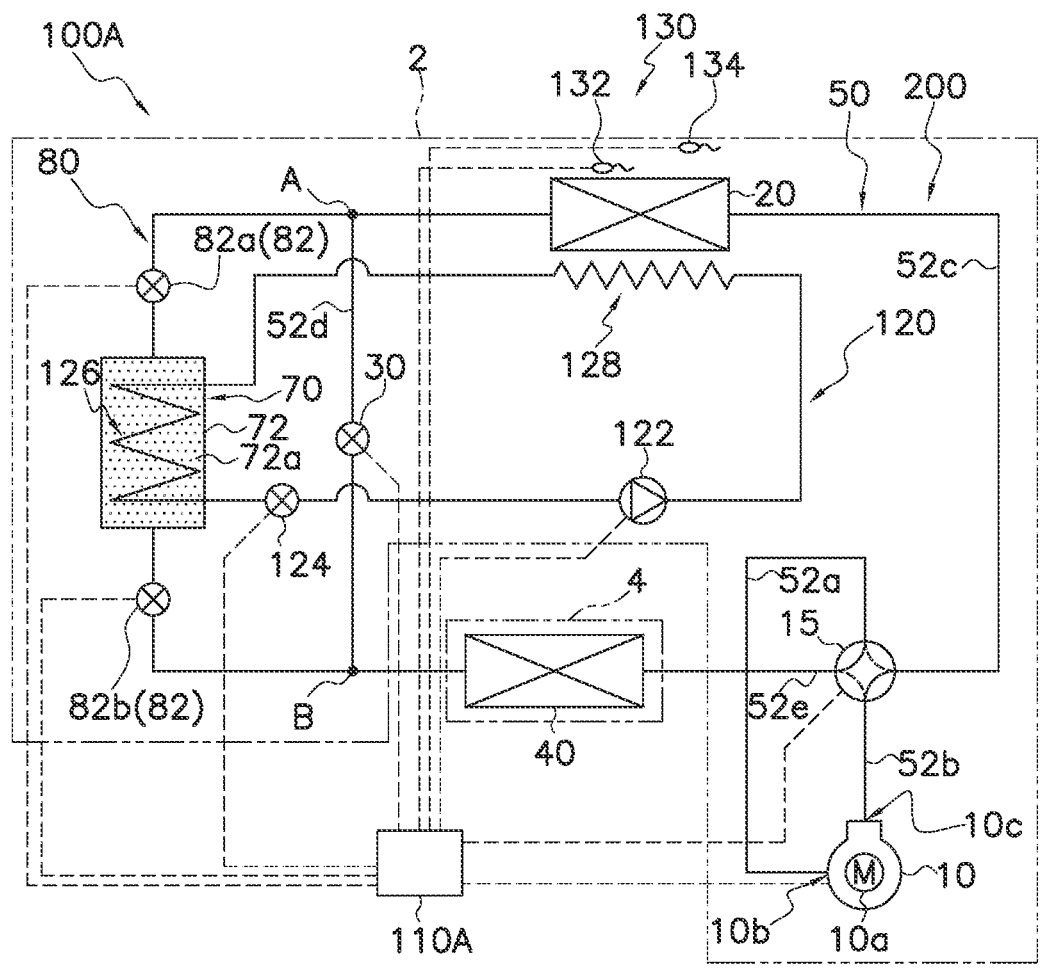
FIG. 5 is a schematic configuration diagram of a refrigeration cycle apparatus according to a second embodiment.

A refrigeration cycle apparatus 100A according to a second embodiment will be described with reference to FIG. 5. FIG. 5 is a schematic configuration diagram of the refrigeration cycle apparatus 100A. In FIG. 5, the same components as those of the refrigeration cycle apparatus 100 of the first embodiment are denoted by the same reference numerals. Note that the second bypass flow path 90 is not shown in FIG. 5 to avoid complication of the drawing.

The main difference between the refrigeration cycle apparatus 100A and the refrigeration cycle apparatus 100 of the first embodiment is that the refrigeration cycle apparatus 100A includes a defrost medium circuit 120 and a first detection section 130. In other respects, the refrigeration cycle apparatus 100A and the refrigeration cycle apparatus 100 are common in many respects. Here, in order to avoid redundant descriptions, the defrost medium circuit 120 and the first detection section 130, which are the different points from the refrigeration cycle apparatus 100, will be mainly described, and description of the common points to the refrigeration cycle apparatus 100 will be basically omitted.

As shown in FIG. 5, the refrigeration cycle apparatus 100A mainly includes a main refrigerant circuit 50 as an example of the refrigeration cycle, an adsorption section 70, a first bypass flow path 80, a second bypass flow path (not depicted in FIG. 5), a defrost medium circuit 120, a first detection section 130, and a controller 110A.

Because the main refrigerant circuit 50, the adsorption section 70, the first bypass flow path 80, and the second bypass flow path are the same as those of the first embodiment, the description thereof will be omitted here.

In the defrost medium circuit 120, adsorption heat generated when the adsorbent 72a absorbs heat from the first refrigerant is used to suppress frost formation on the heat-source heat exchanger 20 and to defrost the heat-source heat exchanger 20. The defrost medium circuit 120 is housed in a casing, not shown, of the heat source unit 2.

The first detection section 130 detects frost formation on the heat-source heat exchanger 20.

The controller 110A has a physical configuration similar to that of the controller 110 of the first embodiment. In addition to controlling the operations of the various devices of the refrigeration cycle apparatus 110A described in the first embodiment, the controller 100A controls the operations of a pump 122 and a medium circuit valve 124 provided in the defrost medium circuit 120, as will be described later.

(2) Detailed Configuration (2-1) Defrost Medium Circuit

The defrost medium circuit 120 is a path through which the medium flows. The medium here is, for example, brine. However, the type of medium flowing through the defrost medium circuit 120 is not limited to brine, and may be selected as appropriate.

The defrost medium circuit 120 includes the pump 122, the medium circuit valve 124, a first heat exchange section 126, and a second heat exchange section 128. The pump 122, the medium circuit valve 124, the first heat exchange section 126, and the second heat exchange section 128 are connected by pipes to form the defrost medium circuit 120.

The pump 122 is used to circulate the medium in the defrost medium circuit 120. The pump 122 is, for example, an inverter pump capable of controlling the number of revolutions of a motor. However, the pump 122 is not limited to a pump with a controllable number of revolutions, and may be a pump with a constant number of revolutions.

The medium circuit valve 124 is used to adjust the amount of the medium flowing through the defrost medium circuit 120, for example. The medium circuit valve 124 is, for example, an electric valve with an adjustable opening degree.

The first heat exchange section 126 is disposed, for example, inside the container 72 of the adsorption section 70. For example and without limitation of type, the first heat exchange section 126 is a coil-type heat exchanger in which a heat transfer tube with end portions (refrigerant inlet and outlet) disposed outside the container 72 is wound in a coil shape. Pipes of the defrost medium circuit 120 are connected to both ends of the first heat exchange section 126. Note that the first heat exchange section 126 may not be disposed inside the container 72. For example, the first heat exchange section 126 may be a coil-type heat exchanger disposed to surround the container 72. The medium flows through the first heat exchange section 126. The medium flowing through the first heat exchange section 126 is heated by the adsorption section 70. Specifically, the medium flowing through the first heat exchange section 126 is heated by the adsorption heat of the adsorbent 72a inside the container 72.

The second heat exchange section 128 is disposed close to the heat-source heat exchanger 20. For example, when functioning as an evaporator, the second heat exchange section 128 is disposed in the vicinity of a portion of the heat-source heat exchanger 20 that is particularly prone to frost formation. For example and without limitation of type, the second heat exchange section 128 is a finned tube. The second heat exchange section 128 at least partially heats the heat-source heat exchanger 20 by the medium flowing therein.

(2-2) First Detection Section

The first detection section 130 detects frost formation on the heat-source heat exchanger 20 when the refrigeration cycle apparatus 100 performs the heating operation.

The first detection section 130 includes, for example, a temperature sensor 132 that is attached to the heat-source heat exchanger 20 and measures the temperature of the refrigerant flowing through the heat-source heat exchanger 20, and a temperature sensor 134 that measures the temperature of the heat source air. The temperature sensor 132 and the temperature sensor 134 are, for example, thermistors. For example, if a state in which the temperature of the refrigerant flowing through the temperature sensor 132 is less than or equal to a predetermined value continues for a predetermined time, or if a state in which the temperature of the heat source air is less than or equal to a predetermined value continues for a predetermined time, the first detection section 130 detects that there is frost formation on the heat-source heat exchanger 20. For example, the first detection section 130 may detect that there is frost formation on the heat-source heat exchanger 20 based on the value of the difference between the temperature of the refrigerant flowing through the temperature sensor 132 and the temperature of the heat source air.

Note that the controller 110A may function as a part of the first detection section 130, and may detect frost formation on the heat-source heat exchanger 20 based on the measurement result of the temperature sensor 132 or the temperature sensor 134. Alternatively, the first detection section 130 may be a device independent of the controller 110A, and may detect frost formation on the heat-source heat exchanger 20 based on the measurement result of the temperature sensor 132 or the temperature sensor 134, and transmit the detection result to the controller 110A. In the following description, it is assumed that the controller 110A functions as a part of the first detection section 130 and detects frost formation on the heat-source heat exchanger 20 based on the measurement result of the temperature sensor 132 or the temperature sensor 134.

Note that the first detection section 130 does not need to detect frost formation on the heat-source heat exchanger 20 based on the measurement results of the temperature sensor 132 and the temperature sensor 134. For example, the first detection section 130 may detect (determine) that the heat-source heat exchanger 20 has frost formation when the duration of the heating operation reaches a predetermined time, instead of from the measurement result of the temperature sensor.

(2-3) Controller

Similarly to the controller 110 of the first embodiment, the controller 110A controls the operations of various devices of the refrigeration cycle apparatus 100A. Because the controller 110A has many points in common with the controller 110, differences from the controller 110 will be mainly described here, and description of the common points will be basically omitted.

In addition to the various devices of the refrigeration cycle apparatus 100 described in the first embodiment, the controller 110A is electrically connected to the pump 122 and the medium circuit valve 124 of the defrost medium circuit 120, and controls the operations of the pump 122 and the medium circuit valve 124. In addition, the controller 110A is electrically connected to the temperature sensor 132 and the temperature sensor 134, and can acquire measurement values of the temperature sensor 132 and the temperature sensor 134. Note that the controller 110A is also electrically connected to sensors, not shown, arranged in various locations of the refrigeration cycle apparatus 100 other than the temperature sensors 132, 134, and can acquire measurement values of these sensors.

Similarly to the controller 110 of the first embodiment, the controller 110A controls the operations of various devices of the refrigeration cycle apparatus 100 during the cooling operation and the heating operation. Further, similarly to the controller 110 of the first embodiment, the controller 110A performs adsorption control and desorption control. As to the contents of control executed by the controller 110A during the cooling operation, the heating operation, the adsorption control, and the desorption control, the description will be omitted here to avoid redundant descriptions.

The controller 11A further performs a frost suppressing operation and a defrost operation. The frost suppressing operation and the defrost operation will be described. Note that the controller 110A may execute both the frost suppressing operation and the defrost operation, or may execute only one of the frost suppressing operation and the defrost operation.

(2-3-1) Frost Suppressing Operation

If the first detection section 130 detects frost formation on the heat-source heat exchanger 20, the controller 110A executes a frost suppressing operation for suppressing frost formation on the heat-source heat exchanger 20 while continuing the heating operation.

Figure 6A:
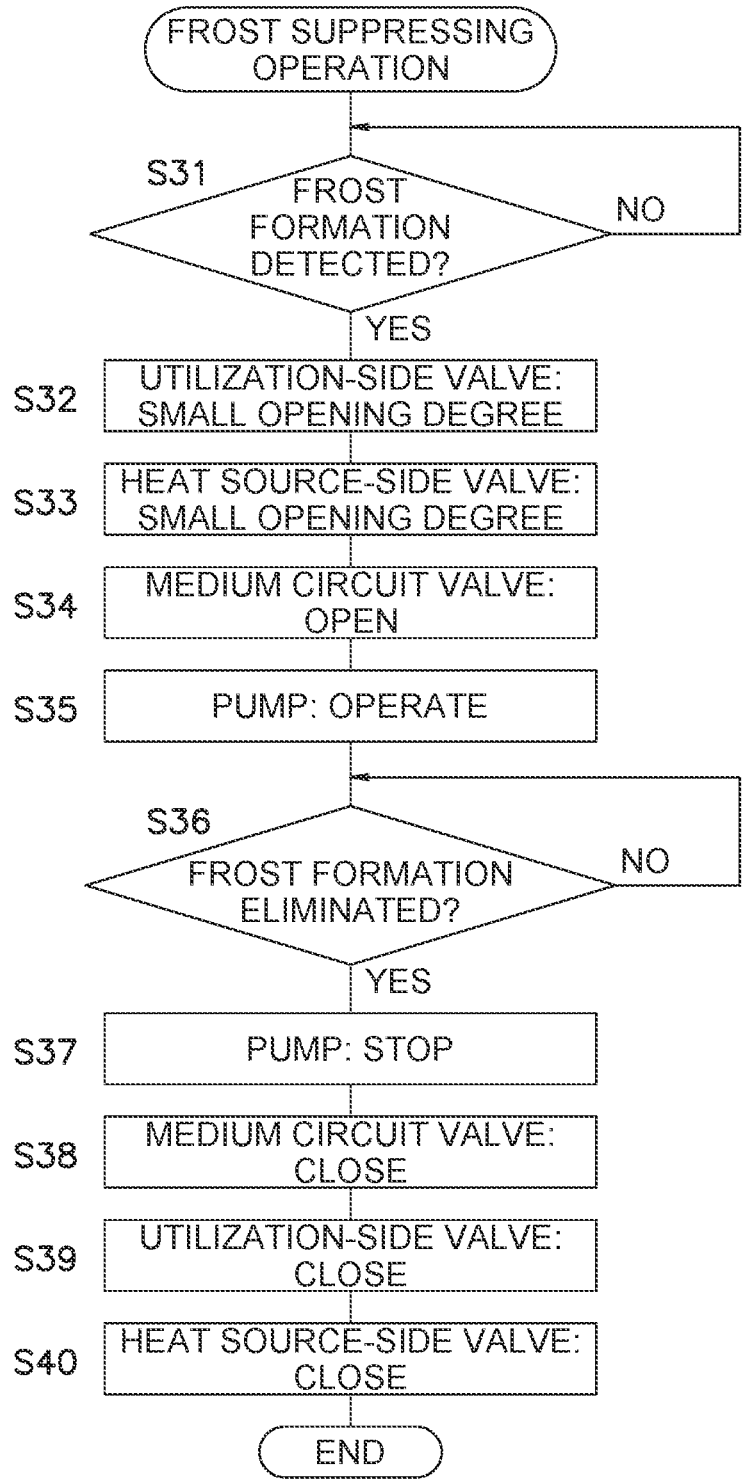
FIG. 6A is an example of a flowchart of a frost suppressing operation of the refrigeration cycle apparatus of FIG. 5.

Hereinafter, the frost suppressing operation by the controller 110A will be described while referring to the flowchart of FIG. 6A. FIG. 6A is an example of a flowchart, of the frost suppressing operation of the refrigeration cycle apparatus 100A. Note that, as a premise of the description, it is assumed that the controller 110A is controlling various devices of the refrigeration cycle apparatus 100 so that the refrigeration cycle apparatus 100 can perform the heating operation.

If the first detection section 130 detects frost formation on the heat-source heat exchanger (Yes in step S31), the controller 110A executes the control of step S32 and the subsequent steps. Specifically, if the controller 110A detects frost formation on the heat-source heat exchanger 20 based on the temperature measured by the temperature sensor 132, the temperature measured by the temperature sensor 134, or the temperatures measured by the temperature sensor 132 and the temperature sensor 134, the controller 110A executes the control of step S32 and the subsequent steps. The determination in step S31 is repeatedly executed until "Yes" is determined in step S31.

The controller 110A opens the utilization-side valve 82b, which has been closed, in step S32, and opens the heat source-side valve 82a, which has been closed, in step S33. Here, the reason for opening the heat source-side valve 82a and the utilization-side valve 82b is to use the adsorption heat of the adsorbent 72a, and it is not the direct purpose of the opening to change the composition of the refrigerant flowing through the main refrigerant circuit 50, so the opening degrees of the heat source-side valve 82a and the utilization-side valve 82b are both controlled to be relatively small. In addition, the controller 110A opens the medium circuit valve 124, which has been closed, and adjusts the valve to a predetermined opening degree (step S34), and operates the pump 122, which has been stopped, at a predetermined number of revolutions (step S35). Note that the order in which step S32 to step S35 are executed may be changed as appropriate within a range that does not lead to any contradictions. In addition, some or all of step S32 to step S35 may be executed simultaneously. When the control of step S32 to step S35 is executed, the medium heated by the adsorption heat of the adsorbent 72a of the adsorption section 70 in the first heat exchange section 126 flows to the second heat exchange section 128 to heat the heat-source heat exchanger 20. As a result, frost formation on the heat-source heat exchanger 20 is suppressed or eliminated.

In step S36, the controller 110A determines whether the frost formation on the heat-source heat exchanger 20 has been eliminated. For example, the controller 110A determines whether the frost formation on the heat-source heat exchanger 20 has been eliminated based on the temperature measured by the temperature sensor 132, the temperature measured by the temperature sensor 134, or the temperatures measured by the temperature sensor 132 and the temperature sensor 134. Note that the controller 110A may determine whether the frost formation on the heat-source heat exchanger 20 has been eliminated based on the measurement results of sensors other than the temperature sensors 132, 134. Alternatively, the controller 110A may determine that the frost formation on the heat-source heat exchanger 20 has been eliminated when a predetermined time has elapsed from the start of the frost suppressing operation.

Note that in FIG. 6A, the determination in step S36 is repeated until it is determined that the frost formation has been eliminated; however, this is not a limitation. For example, when the frost formation is not eliminated even when a predetermined time elapses, the controller 110A may interrupt the heating operation of the refrigeration cycle apparatus 100 and cause the refrigeration cycle apparatus 100 to perform the defrost operation. At this time, as will be described later, a defrost of the heat-source heat exchanger 20 may be performed by also utilizing the defrost medium circuit 120. In another example, the defrost medium circuit 120 may not be utilized when the refrigeration cycle apparatus 100 performs the defrost operation.

If it is determined that the frost formation on the heat-source heat exchanger 20 has been eliminated (Yes in step S36), the controller 110A executes the control of step S37 to step S40. The controller 110A stops the pump 122 in step S37 and closes the medium circuit valve 124 in step S38. Also, the controller 110A closes the utilization-side valve 82b in step S39, and closes the heat source-side valve 82a in step S40. Note that the order in which step S37 to step S40 are executed may be changed as appropriate within a range that does not lead to any contradictions. In addition, some or all of step S37 to step S40 may be executed simultaneously.

Although illustration and detailed description are omitted here, if the determination is Yes in step S36, the controller 110A may desorb the first refrigerant that has been adsorbed onto the adsorbent 72a during the frost suppressing operation, before executing the control of step S39 and step S40. After the first refrigerant is desorbed from the adsorbent 72a, the control of step S39 and step S40 may be executed.

Figure 6B:
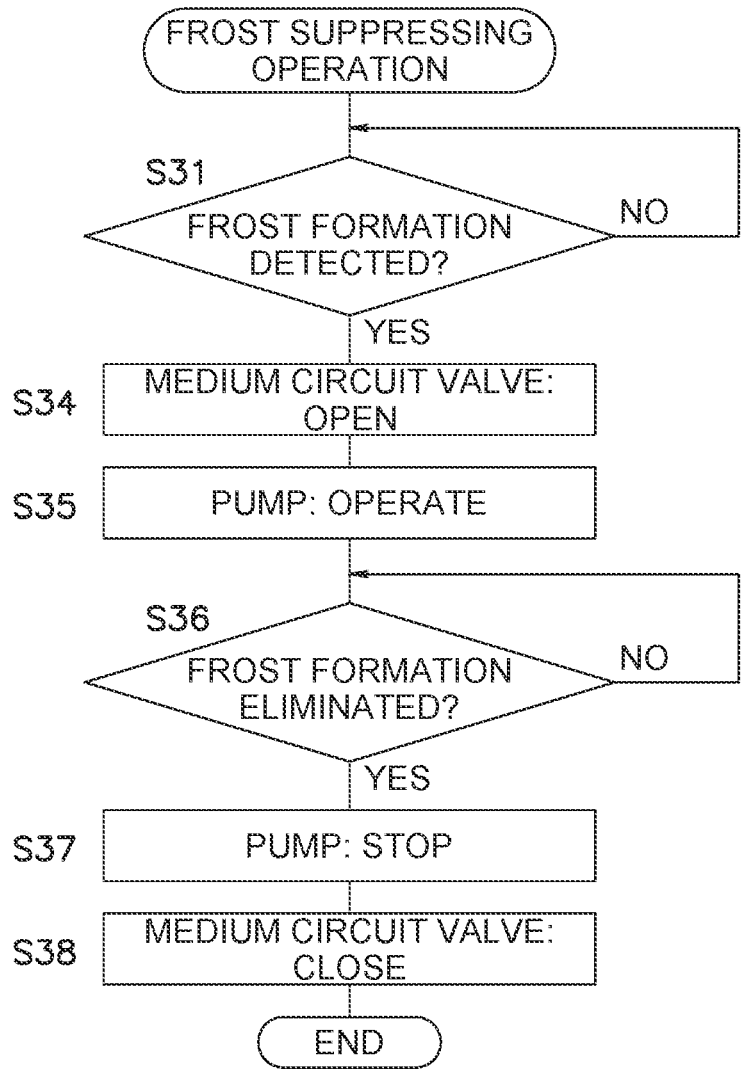
FIG. 6B is another example of a flowchart of the frost suppressing operation of the refrigeration cycle apparatus of FIG. 5.

Note that in the example of FIG. 6A, the controller 110A operates the heat source-side valve 82a and the utilization-side valve 82b. However, this is not a limitation, and the controller 110A may not operate the heat source-side valve 82a and the utilization-side valve 82b during the frost suppressing operation, as shown in FIG. 6B. In other words, during the frost suppressing operation, the heat source-side valve 82a and the utilization-side valve 82b may always be closed. Even in the case of such a configuration, if the adsorption heat of the adsorbent 72a is stored in the container 72, it is possible to utilize this to suppress the frost formation on the heat-source heat exchanger 20 or to remove the frost formed on the heat-source heat exchanger 20. Further, for example, a temperature sensor (not shown) may be provided in the container 72, and the controller 110A may perform the operation according to the flowchart of FIG. 6 if the temperature in the container 72 is lower than a predetermined temperature, and may perform the operation according to the flowchart of FIG. 6B if the temperature in the container 72 is higher than the predetermined temperature.

(2-3-2) Defrost Operation

If the first detection section 130 detects frost formation on the heat-source heat exchanger 20, the controller 110A may not execute the frost suppressing operation, but may interrupt the heating operation and execute a defrost operation for removing the frost formed on the heat-source heat exchanger 20 in a manner described hereinafter. Alternatively, the controller 110A may execute the defrost operation in a manner described hereinafter if the frost formation on the heat-source heat exchanger 20 is not eliminated even when the frost suppressing operation is executed.

Here, the defrost operation will be described by taking, as an example, a case where, if the first detection section 130 detects frost formation on the heat-source heat exchanger 20, the controller 110A executes the defrost operation without executing the frost suppressing operation.

Figure 7:
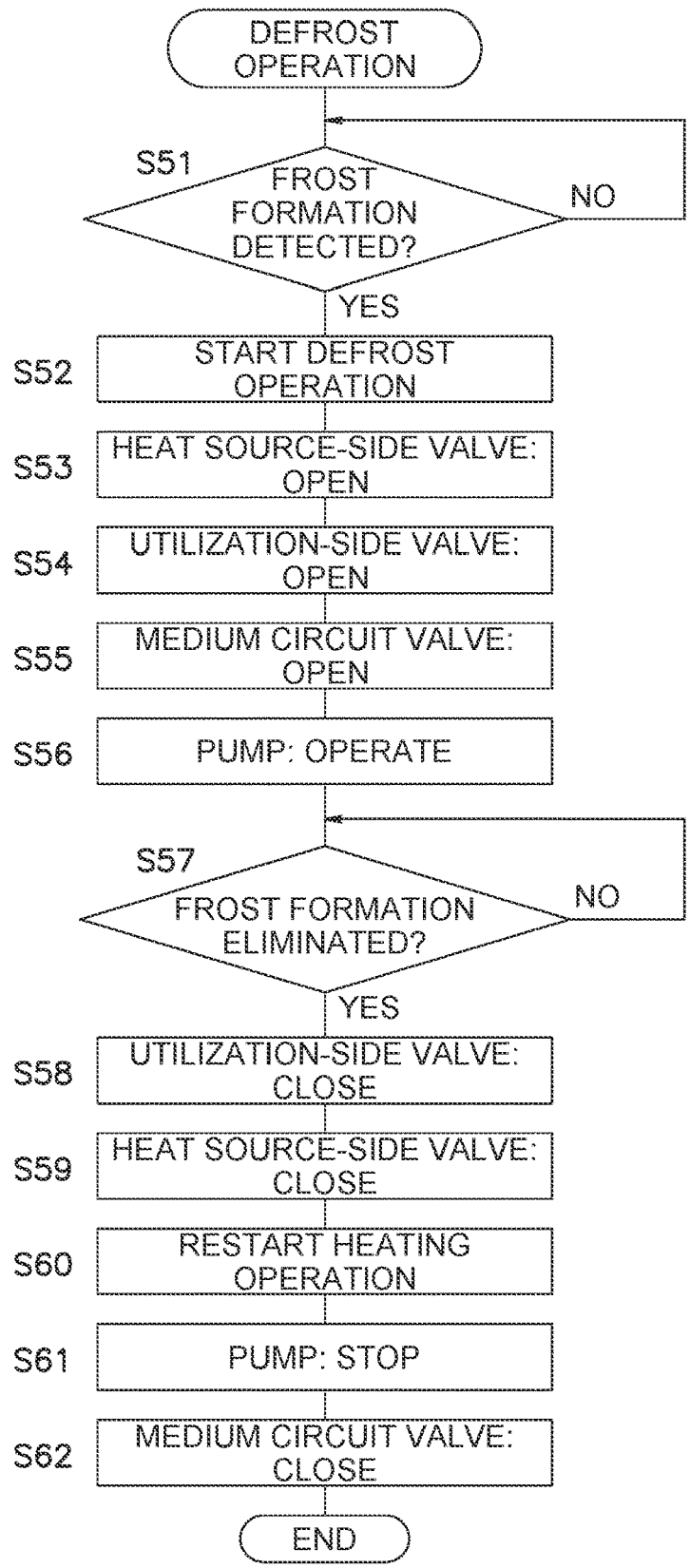
FIG. 7 is an example of a flowchart of a defrost operation of the refrigeration cycle apparatus of FIG. 5.

Hereinafter, the defrost operation performed by the controller 110A will be described with reference to the flowchart of FIG. 7. FIG. 7 is an example of a flowchart of the defrost operation of the refrigeration cycle apparatus 100A. Note that, as a premise of the description, it is assumed that at the time of step S51, the controller 110A is controlling various devices of the refrigeration cycle apparatus 100 so that the refrigeration cycle apparatus 100 can perform the heating operation.

If the first detection section 130 detects frost formation on the heat-source heat exchanger (Yes in step S51), the controller 110A executes the control of step S52 and the subsequent steps. The determination in step S51 is repeatedly executed until "Yes" is determined in step S51.

In step S52, the controller 110A interrupts the heating operation, controls the flow path switching mechanism 15 to change the flow direction of the refrigerant as in the cooling operation, and starts the defrost operation.

Next, the controller 110A opens the heat source-side valve 82a in step S53, and opens the utilization-side valve 82b in step S54. At this time, the controller 110A may adjust the opening degrees of the heat source-side valve 82a and the utilization-side valve 82b so that the flow path area of the heat source-side valve 82a, which is an example of the first valve, is larger than the flow path area of the utilization-side valve 82b, which is an example of the second valve. Alternatively, the controller 110A may control the opening degrees of both the heat source-side valve 82a and the utilization-side valve 82b to be relatively small. In addition, the controller 110A opens the medium circuit valve 124, which has been closed, to a predetermined opening degree (step S55), and operates the pump 122, which has been stopped, at a predetermined number of revolutions (step S56). Note that the order in which steps S53 to S56 are executed may be changed as appropriate within a range that does not lead to any contradictions. In addition, some or all of step S53 to step S56 may be executed simultaneously.

When the control of steps S53 to S56 is executed, the medium heated by the adsorption heat of the adsorbent 72a of the adsorption section 70 in the first heat exchange section 126 flows to the second heat exchange section 128 to heat the heat-source heat exchanger 20. As a result, removal of frost adhering to the heat-source heat exchanger 20 is promoted.

In step S57, the controller 110A determines whether the frost formation on the heat-source heat exchanger 20 has been eliminated. For example, the controller 110A determines whether the frost formation on the heat-source heat exchanger 20 has been eliminated based on the temperature measured by the temperature sensor 132, the temperature measured by the temperature sensor 134, or the temperatures measured by the temperature sensor 132 and the temperature sensor 134. Note that the controller 110A may determine whether the frost formation on the heat-source heat exchanger 20 has been eliminated based on the measurement results of sensors other than the temperature sensors 132, 134. Alternatively, the controller 110A may determine that the frost formation on the heat-source heat exchanger 20 has been eliminated when a predetermined time has elapsed from the start of the frost suppressing operation. The determination in step S57 is repeated until it is determined that the frost formation has been eliminated.

If it is determined that the frost formation on the heat-source heat exchanger 20 has been eliminated (Yes in step S57), the controller 110A closes the utilization-side valve 82b in step S58, and closes the heat source-side valve 82a in step S59. In addition, the controller 110A ends the defrost operation, controls the flow path switching mechanism 15 to switch the flow direction of the refrigerant to the flow direction of the refrigerant during the heating operation, and resumes the heating operation (step S60). Also, the controller 110A stops the pump 122 in step S61 and closes the medium circuit valve 124 in step S62. Note that the order in which steps S58 to S62 are executed may be changed as appropriate within a range that does not lead to any contradictions. In addition, some or all of step S58 to step S62 may be executed simultaneously.

Note that, although a detailed description is omitted here, when the heating operation is resumed in step S60, desorption control may be performed in order to desorb the first refrigerant adsorbed on the adsorbent 72a during the defrost operation and to increase the concentration of the first refrigerant in the refrigerant flowing through the main refrigerant circuit 50.

Further, while in the example of FIG. 7, the controller 110A operates the heat source-side valve 82a and the utilization-side valve 82b, this is not a limitation, and the heat source-side valve 82a and the utilization-side valve 82b need not be operated as long as the adsorption heat of the adsorbent 72a stored in the container 72 can be utilized for defrosting.

(3) Features

The refrigeration cycle apparatus 100A has the following features in addition to the features of the refrigeration cycle apparatus 100 of the first embodiment.

3-1

The refrigeration cycle apparatus 100A further includes the defrost medium circuit 120 and the first detection section 130. The defrost medium circuit 120 is an example of the first medium circuit. The defrost medium circuit 120 includes the first heat exchange section 126 and the second heat exchange section 128. In the first heat exchange section 126, the medium is heated by the adsorption section 70. The second heat exchange section 128 heats the heat-source heat exchanger 20 with the medium. The first detection section 130 detects frost formation on the heat-source heat exchanger 20. In a case where the first detection section 130 detects frost formation on the heat-source heat exchanger 20, the medium circulates through the defrost medium circuit 120.

In the refrigeration cycle apparatus 100A, the adsorption heat when the first refrigerant is adsorbed onto the adsorbent 72a can be effectively utilized to suppress frost formation on the heat-source heat exchanger 20 and to perform defrosting.

For example, by storing the adsorption heat in the adsorption section 70, this heat can be utilized for a defrost. Further, when the first refrigerant is adsorbed onto the adsorbent 72a in the adsorption section 70 while the medium is circulated, the adsorption heat generated by the adsorbent 72a can be utilized for defrosting.

Third Embodiment (1) Overall Outline

Figure 8:
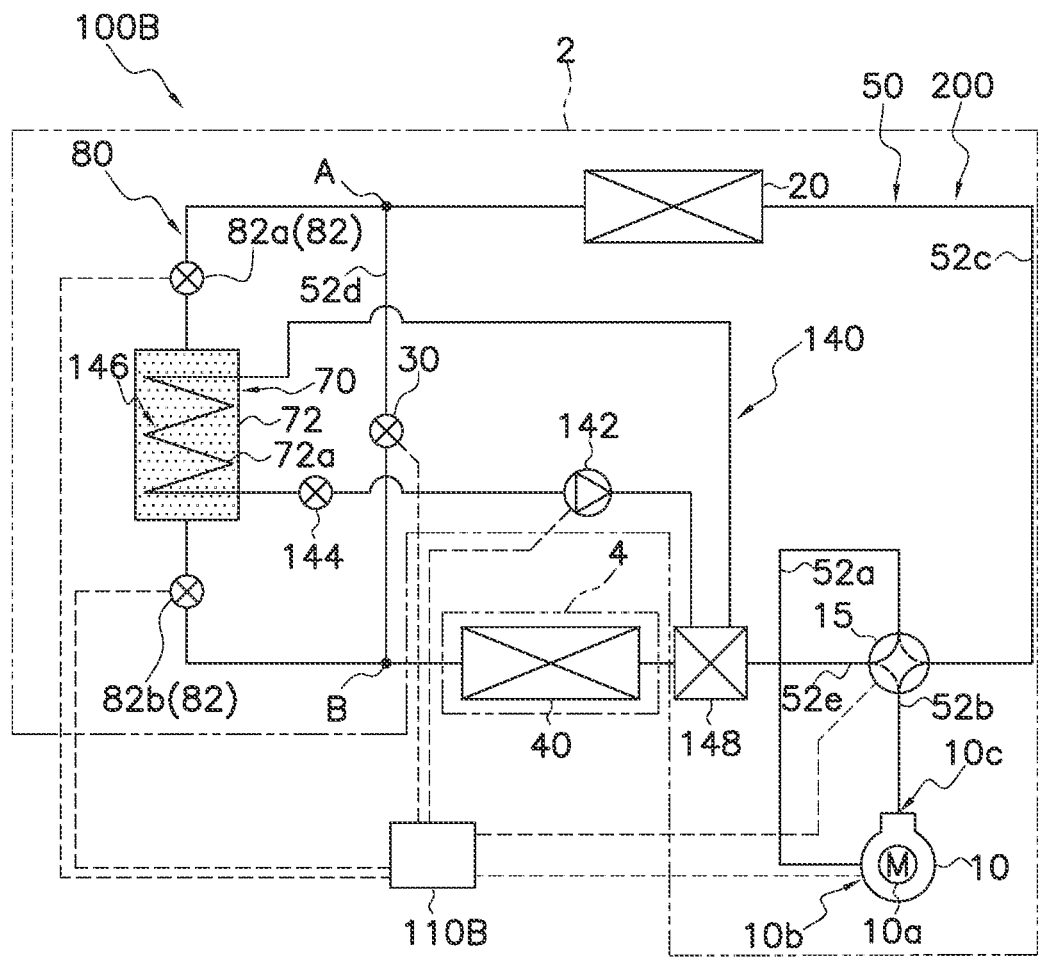
FIG. 8 is a schematic configuration diagram of a refrigeration cycle apparatus according to a third embodiment.

A refrigeration cycle apparatus 100B according to a third embodiment of the refrigeration cycle apparatus of the present disclosure will be described with reference to FIG. 8. FIG. 8 is a schematic configuration diagram of the refrigeration cycle apparatus 100B. In FIG. 8, the same components as those of the refrigeration cycle apparatus 100 of the first embodiment are denoted by the same reference numerals. Note that the second bypass flow path 90 is not shown in FIG. 8 to avoid complication of the drawing. Similarly to the second embodiment, the refrigeration cycle apparatus 100B may further include the defrost medium circuit 120 and the first detection section 130.

The refrigeration cycle apparatus 100B differs from the refrigeration cycle apparatus 100 of the first embodiment in that the main refrigerant circuit 50 includes a superheated heat exchanger 148 in addition to the compressor 10, the flow path switching mechanism 15, the heat-source heat exchanger 20, the expansion mechanism 30, and the utilization heat exchanger 40. In addition, the refrigeration cycle apparatus 100B is different from the refrigeration cycle apparatus 100 of the first embodiment in that a superheated medium circuit 140 is provided.

In other respects, the refrigeration cycle apparatus 100B and the refrigeration cycle apparatus 100 are common in many respects. Here, in order to avoid redundant descriptions, the description will focus on the superheated heat exchanger 148 and the superheated medium circuit 140, which are the different points from the refrigeration cycle apparatus 100, and description of the common points to the refrigeration cycle apparatus 100 will be basically omitted.

As shown in FIG. 8, the refrigeration cycle apparatus 100B mainly includes the main refrigerant circuit 50 as an example of the refrigeration cycle, an adsorption section 70, a first bypass flow path 80, a second bypass flow path (not depicted in FIG. 5), the superheated medium circuit 140, and a controller 110B.

The configuration of the main refrigerant circuit 50 other than the superheated heat exchanger 148, the adsorption section 70, the first bypass flow path 80, and the second bypass flow path are the same as those of the first embodiment, and thus the description thereof will be omitted here.

The superheated heat exchanger 148 is housed in a casing, not shown, of the heat source unit 2. The superheated heat exchanger 148 is disposed between the utilization heat exchanger 40 and the flow path switching mechanism 15 in the main refrigerant circuit 50. The superheated heat exchanger 148 constitutes a part of the main refrigerant circuit 50 and also constitutes a part of the superheated medium circuit 140. For example and without limiting the type of the heat exchanger, the superheated heat exchanger 148 is, for example, a plate-type heat exchanger. In the superheated heat exchanger 148, heat is exchanged between the refrigerant flowing therein and the medium flowing therein. Note that in the superheated heat exchanger 148, a flow path through which the refrigerant flows and a flow path through which the medium flows are sealed so that the refrigerant and the medium do not mix with each other. The superheated heat exchanger 148 is used to adjust the degree of superheating of the refrigerant suctioned into the compressor 10 during the cooling operation. The superheated heat exchanger 148 heats the refrigerant flowing through the superheated heat exchanger 148 by the medium flowing through the superheated medium circuit 140.

The superheated medium circuit 140 is used to heat the refrigerant flowing through the superheated heat exchanger 148 and to adjust the degree of superheating of the refrigerant suctioned into the compressor 10 during the cooling operation. The defrost medium circuit 120 is housed in a casing, not shown, of the heat source unit 2.

The controller 110B has a physical configuration similar to that of the controller 110 of the first embodiment. The controller 110B controls the operations of various devices of the refrigeration cycle apparatus 100B described in the first embodiment, and also controls the operations of the pump 142 and the medium-circuit valve 144 provided in the superheated medium circuit 140, as will be described later.

(2) Detailed Configuration (2-1) Superheated Medium Circuit

The superheated medium circuit 140 is a path through which the medium flows. The medium here is, for example, brine. However, the type of the medium flowing through the superheated medium circuit 140 is not limited to brine, and may be selected as appropriate.

The superheated medium circuit 140 includes the pump 142, the medium circuit valve 144, the first heat exchange section 146, and the superheated heat exchanger 148 as an example of the second heat exchange section. The pump 142, the medium circuit valve 144, the first heat exchange section 146, and the superheated heat exchanger 148 are connected by pipes to form the superheated medium circuit 140.

The pump 142 is used to circulate the medium in the superheated medium circuit 140. The pump 142 is, for example, an inverter pump capable of controlling the number of revolutions of a motor. However, the pump 142 is not limited to a pump with a controllable number of revolutions, and may be a pump with a constant number of revolutions.

The medium circuit valve 144 is used to adjust the amount of the medium flowing through the superheated medium circuit 140. The medium circuit valve 144 is, for example, an electric valve with an adjustable opening degree.

The first heat exchange section 146 is disposed, for example, inside the container 72 of the adsorption section 70. For example and without limiting the type, the first heat exchange section 146 is a coil-type heat exchanger in which a heat transfer tube with end portions (refrigerant inlet and outlet) disposed outside the container 72 is wound in a coil shape. Pipes of the superheated medium circuit 140 are connected to both ends of the first heat exchange section 146. Note that the first heat exchange section 146 may not be disposed inside the container 72. For example, the first heat exchange section 146 may be a coil-type heat exchanger disposed to surround the container 72. The medium flows through the first heat exchange section 146. The medium flowing through the first heat exchange section 146 is heated by the adsorption section 70. Specifically, the medium flowing through the first heat exchange section 146 is heated by the adsorption heat of the adsorbent 72a inside the container 72.

Because the superheated heat exchanger 148, which is an example of the second heat exchange section, has been fully described above, a repeated description thereof will be omitted to avoid redundant descriptions.

(2-2) Controller

Similarly to the controller 110 of the first embodiment, the controller 110B controls the operations of various devices of the refrigeration cycle apparatus 100B. Because the controller 110B has many points in common with the controller 110, differences from the controller 110 will be mainly described here, and description of the common points will be basically omitted.

In addition to the various devices of the refrigeration cycle apparatus 100 described in the first embodiment, the controller 110B is electrically connected to the pump 142 and the medium circuit valve 144 of the superheated medium circuit 140 so as to be able to control the operations of the pump 142 and the medium circuit valve 144.

Similarly to the controller 110 of the first embodiment, the controller 110B controls the operations of various devices of the refrigeration cycle apparatus 100 during the cooling operation and the heating operation. Further, similarly to the controller 110 of the first embodiment, the controller 110B performs adsorption control and desorption control. As to the contents of control executed by the controller 110B during the cooling operation, the heating operation, the adsorption control, and the desorption control, the description will be omitted here.

If the refrigeration cycle apparatus 100B further includes the defrost medium circuit 120 and the first detection section 130 similarly to the refrigeration cycle apparatus 100A of the second embodiment, the controller 110B controls the operations of the various devices of the refrigeration cycle apparatus 100B as described in the second embodiment when the frost suppressing operation and the defrost operation are executed.

The controller 110B further performs superheating control. The superheating control will be described.

(2-3-1) Superheating Control

The controller 110B controls the degree of superheating of the refrigerant suctioned into the compressor 10 to a target degree of superheating by utilizing the adsorption heat of the adsorbent 72a when the cooling operation is performed. The superheating control by the controller 110B is control executed in combination with the adsorption control described above.

Figure 9:
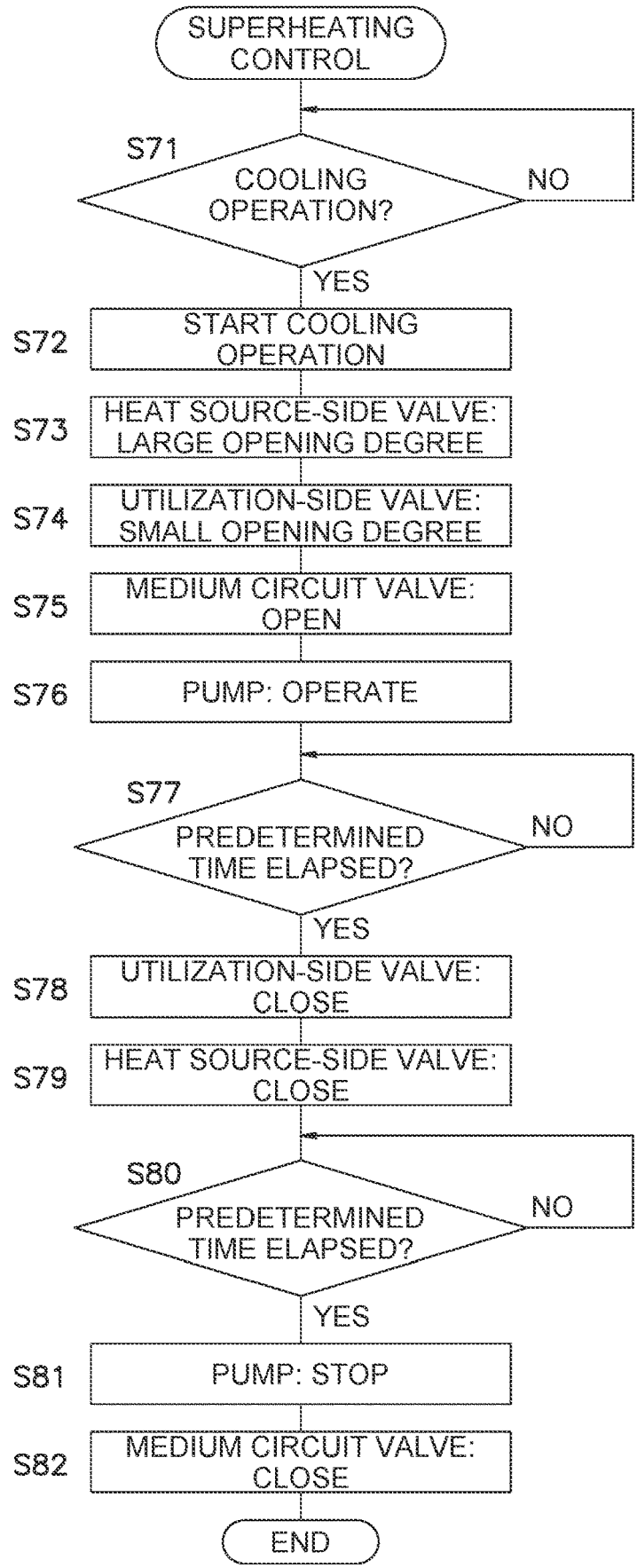
FIG. 9 is an example of a flowchart of superheating control of the refrigeration cycle apparatus of FIG. 8.

Hereinafter, the superheating control including the adsorption control by the controller 110B will be described with reference to a flowchart of FIG. 9. FIG. 9 is an example of a flowchart of the superheating control by the controller 110B.

The superheating control including the adsorption control is executed when, after the refrigeration cycle apparatus 100 has executed the heating operation, the refrigeration cycle apparatus 100 switches the operation mode from the heating operation mode to the cooling operation mode. In other words, at the time of execution of step S71 in the flowchart of FIG. 9, the refrigeration cycle apparatus 100 is in the heating operation or is stopped after the heating operation (without performing the cooling operation).

The control from step S71 to step S74 is the same as the control from step S1 to step S4 of the adsorption control described with reference to FIG. 2, and thus the description thereof will be omitted.

The controller 110B further opens the medium circuit valve 144, which has been closed (step S75), and operates the pump 142, which has been stopped, at a predetermined number of revolutions (step S76). Note that the order in which steps S72 to S76 are executed may be changed as appropriate within a range that does not lead to any contradictions. In addition, some or all of step S72 to step S76 may be executed simultaneously.

When the control from step S73 to step S76 is executed, the medium heated by the adsorption heat of the adsorbent 72a of the adsorption section 70 in the first heat exchange section 146 flows to the superheated heat exchanger 148, and exchanges heat with the refrigerant flowing through the main refrigerant circuit 50 in the superheated heat exchanger 148. Note that the controller 110E adjusts the opening degree of the medium circuit valve 144 so that the degree of superheating of the refrigerant suctioned into the compressor 10, which is measured by various sensors, not shown, becomes the target degree of superheating. In this way, the adsorption heat of the adsorbent 72*a* is utilized to secure a suction superheating degree of the refrigerant.

Here, because the adsorption heat of the adsorbent 72*a* is used to heat the refrigerant, the temperature rise of the adsorbent 72*a* due to the adsorption heat can be easily suppressed, and thus the adsorption of the first refrigerant by the adsorbent 72*a* is less likely to be inhibited by the temperature rise of the adsorbent 72*a*.

Next, in step S77, it is determined whether a predetermined time has elapsed since the heat source-side valve 82*a* and the utilization-side valve 82*b* were opened in step S73 and step S74. As the predetermined time, the time required before a state in which the non-azeotropic refrigerant mixture containing the first refrigerant of a predetermined concentration flows through the main refrigerant circuit 50 becomes a state in which the second refrigerant flows substantially solely through the main refrigerant circuit 50 is used. For example, the predetermined time may be determined by performing an experiment in advance, or may be theoretically obtained.

If it is determined in step S77 that the predetermined time has elapsed since the heat source-side valve 82*a* and the utilization-side valve 82*b* were opened in step S73 and step S74, the controller 110B closes the utilization-side valve 82*b* in step S78, and closes the heat source-side valve 82*a* in step S79. Note that the order of step S78 and step S79 may be reversed, or step S78 and step S79 may be executed simultaneously.

Further, in step S80, it is determined whether a predetermined time has elapsed since the heat source-side valve 82*a* and the utilization-side valve 82*b* were opened in step S73 and step S74, or since the heat source-side valve 82*a* and the utilization-side valve 82*b* were closed in step S78 and step S79. As the predetermined time here, the time until the heat storage amount of the adsorbent 72*a* of the adsorption section 70 decreases and it becomes difficult to utilize the adsorbent 72*a* for superheating of the refrigerant is used. For example, the predetermined time may be determined by performing an experiment in advance, or may be theoretically obtained.

If it is determined in step S80 that the predetermined time has elapsed (Yes in step S80), the controller 110B executes the control of steps S81 to S82. The controller 110B stops the pump 142 in step S81 and closes the medium circuit valve 144 in step S82. Note that the order of executing steps S81 and S82 may be reversed if possible, or steps S81 and S82 may be executed simultaneously.

Note that when the suction superheating degree is controlled even after the end of the control of the suction superheating degree by the medium, for example, the superheating degree may be adjusted by controlling the expansion mechanism 30, for example.

Note that, in the flowchart of FIG. 9, in step S80, the execution timing of step S81 and step S82 is controlled based on the time from when the heat source-side valve 82*a* and the utilization-side valve 82*b* were opened in step S73 and step S74, or the time from when the heat source-side valve 82*a* and the utilization-side valve 82*b* were closed in step S78 and step S79. However, this is not a limitation, and the controller 110B may determine the timing of executing the control of step S81 and step S82 based on the measurement results of temperature sensors provided in the container 72 of the adsorption section 70 and in the pipes of the superheated medium circuit 140.

(3) Features

The refrigeration cycle apparatus 100B has the following features in addition to the features of the refrigeration cycle apparatus 100 of the first embodiment.

3-1

The refrigeration cycle apparatus 100B includes the superheated medium circuit 140 through which the medium flows. The superheated medium circuit 140 is an example of a second medium circuit. The superheated medium circuit 140 includes the first heat exchange section 146, and the superheated heat exchanger 148 as an example of the second heat exchange section. In the first heat exchange section 146, the medium is heated by the adsorption section 70. In the superheated heat exchanger 148, the medium heats the refrigerant flowing into the compressor 10.

In the refrigeration cycle apparatus 100B, the refrigerant that is suctioned into the compressor 10 can be heated by effectively utilizing the adsorption heat when the first refrigerant is adsorbed onto the adsorbent 72*a*.

Fourth Embodiment (1) Overall Outline

Figure 10:
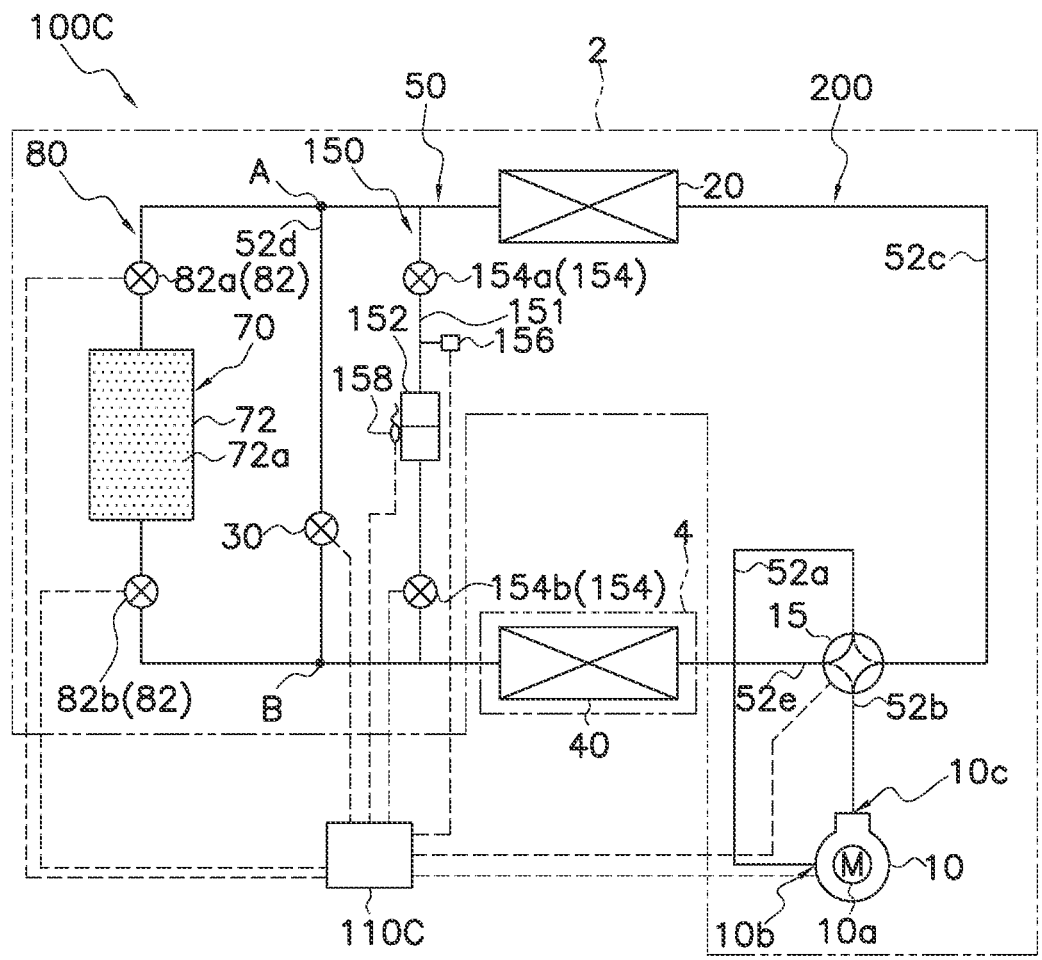
FIG. 10 is a schematic configuration diagram of a refrigeration cycle apparatus according to a fourth embodiment.

A refrigeration cycle apparatus 100C according to a fourth embodiment of the refrigeration cycle apparatus of the present disclosure will be described with reference to FIG. 10. FIG. 10 is a schematic configuration diagram of the refrigeration cycle apparatus 100C. In FIG. 10, the same components as those of the refrigeration cycle apparatus 100 of the first embodiment are denoted by the same reference numerals. Note that the second bypass flow path 90 is not shown in FIG. 10 to avoid complication of the drawing. The refrigeration cycle apparatus 100C may further include the defrost medium circuit 120 and the first detection section 130 of the second embodiment, or the superheated medium circuit 140 of the third embodiment.

The refrigeration cycle apparatus 100C is different from the refrigeration cycle apparatus 100 of the first embodiment in that a second detection section 150 is provided.

In other respects, the refrigeration cycle apparatus 100C and the refrigeration cycle apparatus 100 are common in many respects. Here, in order to avoid redundant descriptions, the second detection section 150, which is a difference from the refrigeration cycle apparatus 100, will be mainly described, and description of the common points to the refrigeration cycle apparatus 100 will be basically omitted.

As shown in FIG. 10, the refrigeration cycle apparatus 100C mainly includes a main refrigerant circuit 50 as an example of the refrigeration cycle, an adsorption section 70, a first bypass flow path 80, a second bypass flow path (not depicted in FIG. 5), the second detection section 150, and a controller 110C.

Because the main refrigerant circuit 50, the adsorption section 70, the first bypass flow path 80, and the second bypass flow path are the same as those of the first embodiment, the description thereof will be omitted here.

The second detection section 150 detects the composition ratio of the refrigerant circulating in the main refrigerant circuit 50. The second detection section 150 is housed in a casing, not shown, of the heat source unit 2.

The controller 110C has a physical configuration similar to that of the controller 110 of the first embodiment. The controller 110C differs from the controller 110 of the first embodiment mainly in that the controller 110C controls the valves 82 of the first bypass flow path 80 using the composition ratio of the refrigerant circulating in the main refrigerant circuit 50 according to the second detection section 150.

(2) Detailed Configuration (2-1) Second Detection Section

The second detection section 150 detects the composition ratio of the refrigerant circulating in the main refrigerant circuit 50.

The second detection section 150 includes a pipe 151 that connects the section between the heat-source heat exchanger 20 and the expansion mechanism 30 and the section between the utilization heat exchanger 40 and the expansion mechanism 30 in the main refrigerant circuit 50. Note that the pipe 151 is used to detect the composition of the refrigerant flowing through the main refrigerant circuit 50, and is not directly required for the vapor compression refrigeration cycle. The pipe 151 is a pipe having a diameter smaller than that of the liquid refrigerant pipe 52d, and a very small amount of refrigerant flows therethrough.

The second detection section 150 includes a refrigerant container 152 and valves 154 that are disposed in the pipe 151. The valves 154 include a first valve 154a and a second valve 154b. The first valve 154a is disposed between the refrigerant container 152 and a portion of the pipe 151 connected to the liquid refrigerant pipe 52d between the heat-source heat exchanger 20 and the expansion mechanism 30. The second valve 154b is disposed between the refrigerant container 152 and a portion of the pipe 151 connected to the liquid refrigerant pipe 52d between the utilization heat exchanger 40 and the expansion mechanism 30. The first valve 154a and the second valve 154b are, for example, opening variable electronic expansion valves. However, this is not a limitation, and the first valve 154a and the second valve 154b may be, for example, capillary tubes. The second detection section 150 includes a pressure sensor 156 that measures the pressure of the refrigerant in the refrigerant container 152, and a temperature sensor 158 that measures the temperature of the refrigerant in the refrigerant container 152.

The controller 110C opens the first valve 154a and the second valve 154b as necessary during the cooling operation or the heating operation, and controls the first valve 154a and the second valve 154b to predetermined opening degrees so that a two-phase (liquid-phase and gas-phase) refrigerant is present in the refrigerant container 152. For example, when performing the adsorption control and the desorption control, the controller 110C opens the first valve 154a and the second valve 154b and controls the first valve 154a and the second valve 154b to predetermined opening degrees so that the two-phase refrigerant is stored in the refrigerant container 152.

In the non-azeotropic refrigerant mixture, if the type of refrigerant used in the non-azeotropic refrigerant mixture and the pressure and temperature of the two-phase refrigerant are known, the composition ratio can be calculated. Accordingly, the second detection section 150 can detect the composition ratio of the refrigerant in the refrigerant container 152, in other words, the composition of the refrigerant flowing through the liquid refrigerant pipe 52d of the main refrigerant circuit 50, based on the pressure of the two-phase refrigerant measured by the pressure sensor 156 and the temperature of the two-phase refrigerant measured by the temperature sensor 158.

The controller 110C may function as a part of the second detection section 150 to detect (calculate) the composition ratio of the refrigerant circulating through the main refrigerant circuit 50 based on the measurement results of the pressure sensor 156 and the temperature sensor 158. Alternatively, the second detection section 150 may be a device independent of the controller 110C and detect the composition ratio of the refrigerant circulating through the main refrigerant circuit 50 based on the measurement results of the temperature pressure sensor 156 and the temperature sensor 158.

In the present embodiment, it is assumed that the controller HOC detects the composition ratio of the refrigerant circulating through the main refrigerant circuit 50 based on the measurement results of the pressure sensor 156 and the temperature sensor 158. Specifically, the memory (storage unit) of the controller 110C stores data (for example, a table or a relational equation) indicating, with respect to the non-azeotropic refrigerant mixture to be used, the relationship between the pressure and temperature of the two-phase refrigerant and the composition ratio of the non-azeotropic refrigerant mixture. The controller 110C detects the composition ratio of the refrigerant circulating through the main refrigerant circuit 50 based on the data stored in the memory indicating the relationship between the pressure and temperature of the two-phase refrigerant and the composition ratio of the non-azeotropic refrigerant mixture, and the measurement results of the pressure sensor 156 and the temperature sensor 158.

Note that the method of detecting the composition ratio of the refrigerant circulating through the main refrigerant circuit 50 need not be limited to the method exemplified here, and the second detection section 150 may detect the composition ratio of the refrigerant circulating through the main refrigerant circuit 50 by another method or by using a device different from the above method.

(2-2) Controller

Similarly to the controller 110 of the first embodiment, the controller 110C controls the operations of various devices of the refrigeration cycle apparatus 100C. Since the controller 110C has many points in common with the controller 110, the differences from the controller 110 will be mainly described, and description of the common points will be basically omitted.

In addition to the various devices of the refrigeration cycle apparatus 100 described in the first embodiment, the controller 110C is electrically connected to the first valve 154a and the second valve 154b of the second detection section 150 so as to be able to control the operations of the first valve 154a and the second valve 154b. In addition, the controller 110C is electrically connected to the pressure sensor 156 and the temperature sensor 158, and can acquire measurement values of the pressure sensor 156 and the temperature sensor 158. Note that the controller 110C is also electrically connected to sensors, not shown, disposed in various locations of the refrigeration cycle apparatus 100 other than the pressure sensor 156 and the temperature sensor 158, and can acquire measurement values of these sensors.

Similarly to the controller 110 of the first embodiment, the controller 110C controls the operations of various devices of the refrigeration cycle apparatus 100 during the cooling operation and the heating operation.

Further, the controller 110C performs adsorption control and desorption control similarly to the controller 110 of the first embodiment. However, the adsorption control and the desorption control executed by the controller 110C are different from the adsorption control and the desorption control executed by the controller 110 of the first embodiment in the following points.

Figure 2:
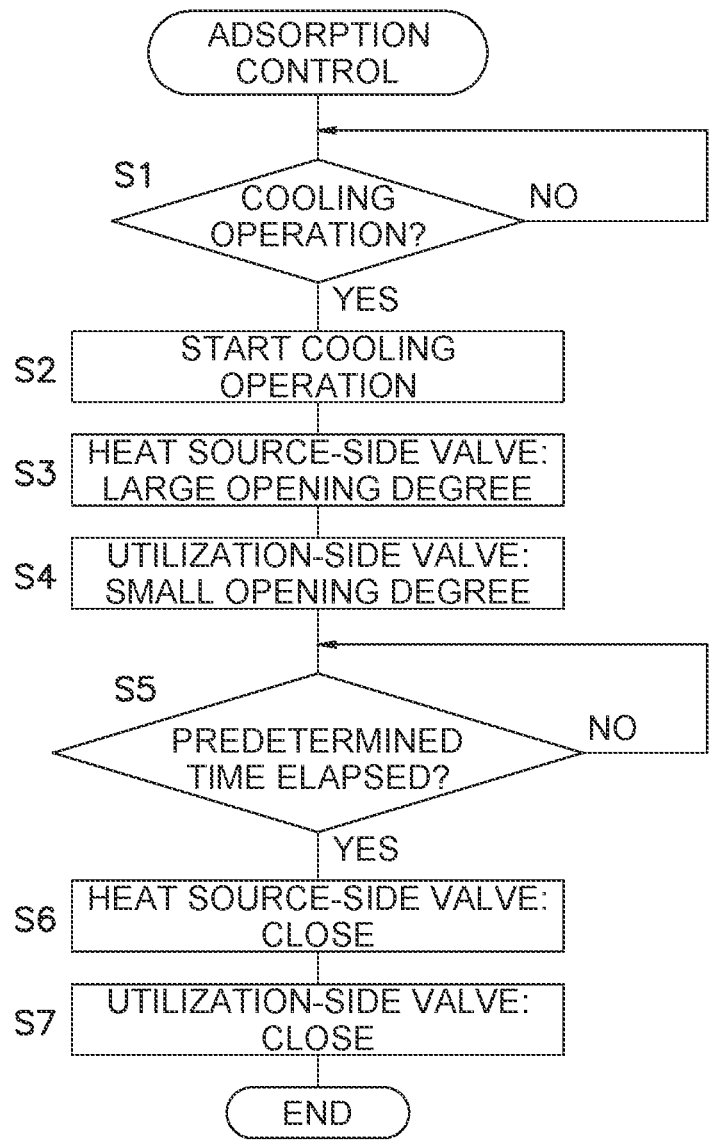
FIG. 2 is an example of a flowchart of adsorption control in the refrigeration cycle apparatus of FIG. 1.

As described in the first embodiment with reference to FIG. 2, in the adsorption control, the timing at which the heat source-side valve 82a and the utilization-side valve 82b are closed is determined based on the elapsed time from when the heat source-side valve 82a and the utilization-side valve 82b were opened. As described in the first embodiment with reference to FIG. 3, in the desorption control, the timing of closing the heat source-side valve 82a and the utilization-side valve 82b is determined based on the elapsed time from when the heat source-side valve 82a and the utilization-side valve 82b were opened.

In this respect, in the adsorption control and the desorption control, the controller 110C closes the heat source-side valve 82a and the utilization-side valve 82b when the composition ratio of the refrigerant circulating through the main refrigerant circuit 50 as detected using the second detection section 150 reaches the target composition ratio. As a result of the timing at which the heat source-side valve 82a and the utilization-side valve 82b are closed being determined by such method, the composition ratio of the refrigerant circulating through the main refrigerant circuit 50 can be controlled with good precision.

(3) Features

The refrigeration cycle apparatus 100C has the following features in addition to the features of the refrigeration cycle apparatus 100 of the first embodiment.

3-1

The refrigeration cycle apparatus 100C includes the second detection section 150. The second detection section 150 detects the composition ratio of the refrigerant circulating in the main refrigerant circuit 50. The valves 82 of the first bypass flow path 80 are controlled such that the composition ratio of the refrigerant detected by the second detection section 150 becomes the target composition ratio.

In the refrigeration cycle apparatus 100C, the refrigerant having an optimum composition ratio can be used to operate the refrigeration cycle apparatus 100C.

<Modifications>

A part or all of the configurations of the first embodiment to the fourth embodiment may be combined as appropriate within a range in which the configurations do not contradict each other.

Hereinafter, modifications of the above-described embodiments will be described. Note that the following modifications may be combined as appropriate as long as they do not contradict each other.

(1) Modification A

In the above embodiments, the refrigeration cycle apparatuses have been described that use the non-azeotropic refrigerant mixture in which the first refrigerant is $CO_2$ and the second refrigerant is R1234Ze or R1234yf of HFO refrigerant. However, the types of the first refrigerant and the second refrigerant are not limited to the exemplified refrigerants. For example, the first refrigerant may be the HFO refrigerant R1132 (E) (trans-1,2-difluoroethylene) or R1123 (trifluoroethylene). Even with such a combination of refrigerants, highly efficient operation can be realized by using the second refrigerant substantially solely, and if the capacity is in shortage when using the second refrigerant solely, the capacity shortage can be compensated for by using the non-azeotropic refrigerant mixture of the first refrigerant and the second refrigerant.

In this case, as the adsorbent 72a, an adsorbent which adsorbs R1132 as the first refrigerant but does not adsorb R1234Ze or R1234yf as the second refrigerant, or an adsorbent of which the adsorption performance for R1234Ze or R1234yf is lower than the adsorption performance thereof for R1132 may be selected. For example, any of the types of adsorbents exemplified in the first embodiment may be selected as the adsorbent 72a.

(2) Modification B

In the above-described embodiments, the refrigeration cycle apparatus of the present disclosure has been described using the refrigeration cycle apparatuses 100, 100A, 100B, 100C that are installed in a building or the like as an example. However, the refrigeration cycle apparatus of the present disclosure is not limited to an apparatus installed in a building. The refrigeration cycle apparatus of the present disclosure may be, for example, an apparatus mounted on a vehicle such as an automobile.

(3) Modification C

In the above embodiment, the refrigeration cycle apparatus of the present disclosure has been described by taking, as an example, the case where the refrigeration cycle apparatuses 100, 100A, 100B, 100C include the heat source unit 2 and the utilization unit 4 connected to the heat source unit 2 by refrigerant pipes. However, the refrigeration cycle apparatus of the present disclosure is not limited to such an apparatus. For example, the refrigeration cycle apparatus of the present disclosure may be an integrated apparatus in which all devices are mounted in one casing.

(4) Modification D

In the above embodiments, the second refrigerant is used substantially solely during the cooling operation, and the non-azeotropic refrigerant mixture of the first refrigerant and the second refrigerant is used during the heating operation.

However, the present invention is not limited to such an aspect, and, even during the heating operation, for example, the second refrigerant may be used substantially solely under conditions in which capacity shortage is not particularly a problem (for example, conditions in which the temperature of the heat source air is relatively high), and the non-azeotropic refrigerant mixture of the first refrigerant and the second refrigerant may be used only during the heating operation and under conditions in which capacity shortage is a problem. In this case, the refrigeration cycle apparatus may be an apparatus that only performs an operation of heating the object for temperature adjustment.

Further, for example, even during the cooling operation, the non-azeotropic refrigerant mixture of the first refrigerant and the second refrigerant may be used if the conditions are such that capacity shortage is a problem. In this case, the refrigeration cycle apparatus may be an apparatus that only performs an operation of cooling the object for temperature adjustment.

(5) Modification F

While the above-described embodiments have been described by taking, as an example, the case where the composition ratio between the first refrigerant and the second refrigerant of the non-azeotropic refrigerant mixture used during the heating operation is uniform, the composition ratio between the first refrigerant and the second refrigerant of the non-azeotropic refrigerant mixture used during the heating operation may be changed in accordance with the operating conditions.

Specifically, the weight concentration of the first refrigerant in the non-azeotropic refrigerant mixture may be increased under a condition in which capacity shortage is likely to occur (for example, when the temperature of the heat source is low), and the weight concentration of the first refrigerant in the non-azeotropic refrigerant mixture may be decreased under a condition in which capacity shortage is relatively unlikely to occur. For example, in the case of the refrigeration cycle apparatus 100 of the first embodiment, such control may be realized by changing the predetermined time of step S17 of FIG. 3 in accordance with the operating conditions. Further, in the refrigeration cycle apparatus 100C of the fourth embodiment, the composition ratio of the non-azeotropic refrigerant mixture flowing through the main refrigerant circuit 50 can be accurately controlled in accordance with the operating conditions by using the second detection section 150.

(6) Modification F

While in the above embodiments, heat of the refrigerant is utilized when the first refrigerant is desorbed from the adsorbent 72a, this is not a limitation. In the refrigeration cycle apparatus of the present disclosure, heat generated by a device such as an electric heater may be utilized when the first refrigerant is desorbed from the adsorbent 72a.

Further, if the first refrigerant can be desorbed only by a difference in pressure, a heating source for desorbing the first refrigerant from the adsorbent 72a may not be particularly provided.

<Additional Remark>

Although embodiments and modifications of the present disclosure have been described above, it will be understood that various changes in form and detail may be made without departing from the spirit and scope of the present disclosure as set forth in the appended claims.

INDUSTRIAL APPLICABILITY

The present disclosure can be widely applied to a refrigeration cycle apparatus and is useful.

REFERENCE SIGNS LIST

10 Compressor
20 Heat-source heat exchanger (radiator, evaporator)
30 Expansion mechanism
40 Utilization heat exchanger (evaporator, radiator)
50 Main refrigerant circuit (refrigeration cycle)
70 Adsorption section
72a Adsorbent
80 First bypass flow path
82 Valve
82a Heat source-side valve (first valve, second valve)
82b Utilization-side valve (second valve, first valve)
90 Second bypass flow path
92 Valve (third valve)
100, 100A, 100B, 100C Refrigeration cycle apparatus
120 Defrost medium circuit (first medium circuit)
126 First heat exchange section
128 Second heat exchange section
130 First detection section
140 Superheated medium circuit (second medium circuit)
146 First heat exchange section
148 Superheated heat exchanger (second heat exchange section)
150 Second detection section
A Heat source-side end (first end, second end)
B Utilization-side end (second end, first end)
C High-pressure end (third end)
D Low-pressure end (fourth end)

CITATION LIST

Patent Literature

PTL 1: S62-80452

The invention claimed is:

1. A refrigeration cycle apparatus comprising:
a refrigeration cycle including a compressor, a radiator, an expansion mechanism, and an evaporator, and configured to use a non-azeotropic refrigerant mixture including a first refrigerant and a second refrigerant;
an adsorption section including an adsorbent configured to adsorb the first refrigerant, and configured to not adsorb the second refrigerant or having lower adsorption performance for the second refrigerant than adsorption performance for the first refrigerant, the adsorption section configured to store the first refrigerant adsorbed by the adsorbent; and
a first bypass flow path connecting a first end which is a high-pressure part of the refrigeration cycle and a second end which is a low-pressure part of the refrigeration cycle, the first bypass flow path having the adsorption section and a valve disposed therein,
the valve including a first valve disposed between the first end and the adsorption section, and a second valve disposed between the adsorption section and the second end,
in a case where making the adsorbent adsorbs the first refrigerant, the first valve and the second valve being opened, and opening degrees of the first valve and the second valve being adjusted such that a flow path area of the first valve is larger than a flow path area of the second valve; and
in a case where making the adsorbent desorbs the first refrigerant, the first valve and the second valve being opened, and the opening degrees of the first valve and the second valve are adjusted such that the flow path area of the second valve is larger than the flow path area of the first valve.

2. The refrigeration cycle apparatus according to claim 1, wherein the second end is disposed between the expansion mechanism and the evaporator of the refrigeration cycle.

3. The refrigeration cycle apparatus according to claim 1, wherein the first end is disposed between the radiator and the expansion mechanism of the refrigeration cycle.

4. The refrigeration cycle apparatus according to claim 1, wherein:
the refrigeration cycle includes a utilization heat exchanger configured to cool an object for temperature adjustment when functioning as the evaporator, and configured to heat the object for temperature adjustment when functioning as the radiator;
when the utilization heat exchanger is utilized as the evaporator, the valve of the first bypass flow path is opened so that the adsorbent adsorbs the first refrigerant; and
when the utilization heat exchanger is utilized as the radiator, the valve of the first bypass flow path is opened so that the adsorbent desorbs the first refrigerant.

5. The refrigeration cycle apparatus according to claim 1, further comprising
a second bypass flow path connecting a third end disposed between the compressor and the radiator of the refrigeration cycle and a fourth end which is a low-pressure part of the refrigeration cycle, and configured to heat the adsorption section with a flowing refrigerant, wherein:
a third valve, configured to control a flow of the refrigerant through the second bypass flow path, is disposed in the second bypass flow path; and
in a case where the adsorbent desorb the first refrigerant, the third valve is opened.

6. The refrigeration cycle apparatus according to claim 1, wherein the first refrigerant is $CO_2$.

7. The refrigeration cycle apparatus according to claim 6, wherein, in a state where $CO_2$ as the first refrigerant is not adsorbed in the adsorbent, a concentration of $CO_2$ as the first refrigerant contained in the non-azeotropic refrigerant mixture is less than or equal to 20 wt %.

8. The refrigeration cycle apparatus according to claim 6, wherein the adsorbent is a metal-organic framework or zeolite with high CO2 adsorption performance.

9. The refrigeration cycle apparatus according to claim 1, wherein the second refrigerant is an HFO refrigerant.

10. The refrigeration cycle apparatus according to claim 1, wherein the refrigeration cycle includes a heat-source heat exchanger functioning as the evaporator,
the refrigeration cycle apparatus further comprising:
a first medium circuit having a first heat exchange section through which a medium flows and in which the medium is configured to be heated by the adsorption section, and a second heat exchange section configured to heat the heat-source heat exchanger with the medium; and
a first detector configured to detect frost formation on the heat-source heat exchanger,
wherein, in a case where the first detector detects frost formation on the heat-source heat exchanger, the medium circulates through the first medium circuit.

11. The refrigeration cycle apparatus according to claim 10, further comprising a second medium circuit having a first heat exchange section in which a medium flows and the medium is heated by the adsorption section, and a second heat exchange section configured to heat the refrigerant flowing into the compressor with the medium.

12. The refrigeration cycle apparatus according to claim 10, further comprising a second detector configured to detect a composition ratio of a refrigerant circulating in the refrigeration cycle, wherein
the valve of the first bypass flow path is controlled such that the composition ratio of the refrigerant detected by the second detector becomes a target composition ratio.

13. The refrigeration cycle apparatus according to claim 2, wherein the first end is disposed between the radiator and the expansion mechanism of the refrigeration cycle.

14. The refrigeration cycle apparatus according to claim 2, wherein:
the refrigeration cycle includes a utilization heat exchanger configured to cool an object for temperature adjustment when functioning as the evaporator, and configured to heat the object for temperature adjustment when functioning as the radiator;
when the utilization heat exchanger is utilized as the evaporator, the valve of the first bypass flow path is opened so that the adsorbent adsorbs the first refrigerant; and
when the utilization heat exchanger is utilized as the radiator, the valve of the first bypass flow path is opened so that the adsorbent desorbs the first refrigerant.

15. The refrigeration cycle apparatus according to claim 3, wherein:
the refrigeration cycle includes a utilization heat exchanger configured to cool an object for temperature adjustment when functioning as the evaporator, and configured to heat the object for temperature adjustment when functioning as the radiator;
when the utilization heat exchanger is utilized as the evaporator, the valve of the first bypass flow path is opened so that the adsorbent adsorbs the first refrigerant; and
when the utilization heat exchanger is utilized as the radiator, the valve of the first bypass flow path is opened so that the adsorbent desorbs the first refrigerant.

16. The refrigeration cycle apparatus according to claim 2, further comprising
a second bypass flow path connecting a third end disposed between the compressor and the radiator of the refrigeration cycle and a fourth end which is a low-pressure part of the refrigeration cycle, and configured to heat the adsorption section with a flowing refrigerant, wherein:
a third valve, configured to control a flow of the refrigerant through the second bypass flow path, is disposed in the second bypass flow path; and
in a case where the adsorbent desorb the first refrigerant, the third valve is opened.

17. The refrigeration cycle apparatus according to claim 3, further comprising
a second bypass flow path connecting a third end disposed between the compressor and the radiator of the refrigeration cycle and a fourth end which is a low-pressure part of the refrigeration cycle, and configured to heat the adsorption section with a flowing refrigerant, wherein:
a third valve, configured to control a flow of the refrigerant through the second bypass flow path, is disposed in the second bypass flow path; and
in a case where the adsorbent desorb the first refrigerant, the third valve is opened.

18. The refrigeration cycle apparatus according to claim 4, further comprising
a second bypass flow path connecting a third end disposed between the compressor and the radiator of the refrigeration cycle and a fourth end which is a low-pressure part of the refrigeration cycle, and configured to heat the adsorption section with a flowing refrigerant, wherein:
a third valve, configured to control a flow of the refrigerant through the second bypass flow path, is disposed in the second bypass flow path; and
in a case where the adsorbent desorb the first refrigerant, the third valve is opened.

19. The refrigeration cycle apparatus according to claim 2, wherein the first refrigerant is $CO_2$.

20. The refrigeration cycle apparatus according to claim 3, wherein the first refrigerant is $CO_2$.

* * * * *